US012737480B2

(12) United States Patent
Lal et al.

(10) Patent No.: US 12,737,480 B2
(45) Date of Patent: Sep. 15, 2026

(54) TECHNOLOGIES FOR TRUSTED I/O WITH A CHANNEL IDENTIFIER FILTER AND PROCESSOR-BASED CRYPTOGRAPHIC ENGINE

(71) Applicant: Intel Corporation, Santa Clara, CA (US)

(72) Inventors: Reshma Lal, Portland, OR (US); Gideon Gerzon, Zichron Yaakov (IL); Baruch Chaikin, Misagv (IL); Siddhartha Chhabra, Portland, OR (US); Pradeep M. Pappachan, Tualatin, OR (US); Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/062,957

(22) Filed: Dec. 7, 2022

(65) Prior Publication Data

US 2023/0128711 A1 Apr. 27, 2023

Related U.S. Application Data

(63) Continuation of application No. 16/931,543, filed on Jul. 17, 2020, now abandoned, which is a (Continued)

(51) Int. Cl.
*G06F 21/00* (2013.01)
*G06F 13/20* (2006.01)

(Continued)

(52) U.S. Cl.
CPC ............ *G06F 21/602* (2013.01); *G06F 13/20* (2013.01); *G06F 13/28* (2013.01); *G06F 21/57* (2013.01);

(Continued)

(58) Field of Classification Search
CPC ........ G06F 21/602; G06F 13/20; G06F 13/28; G06F 21/57; G06F 21/6218;

(Continued)

(56) References Cited

U.S. PATENT DOCUMENTS 7,716,389 B1 5/2010 Bruce
10,181,946 B2 1/2019 Lal et al.

(Continued)

OTHER PUBLICATIONS

Final Office Action, U.S. Appl. No. 15/628,008, Oct. 17, 2019, 33 pages.

(Continued)

*Primary Examiner* — Jeffrey C Pwu
*Assistant Examiner* — Helai Salehi
(74) *Attorney, Agent, or Firm* — Nicholson De Vos Webster & Elliott LLP

(57) ABSTRACT

Technologies for trusted I/O include a computing device having a processor, a channel identifier filter, and an I/O controller. The I/O controller may generate an I/O transaction that includes a channel identifier and a memory address. The channel identifier filter verifies that the memory address of the I/O transaction is within a processor reserved memory region associated with the channel identifier. The processor reserved memory region is not accessible to software executed by the computing device. The processor encrypts I/O data at the memory address in response to invocation of a processor feature and copies the encrypted data to a memory buffer outside of the processor reserved memory region. The processor may securely clean the processor reserved memory region before encrypting and copying the data. The processor may wrap and unwrap programming information for the channel identifier filter. Other embodiments are described and claimed.

24 Claims, 8 Drawing Sheets

Related U.S. Application Data continuation of application No. 15/628,008, filed on Jun. 20, 2017, now Pat. No. 10,789,371.

(60) Provisional application No. 62/352,356, filed on Jun. 20, 2016, provisional application No. 62/352,357, filed on Jun. 20, 2016.

(51) Int. Cl.

| | |
|---|---|
| ***G06F 13/28*** | (2006.01) |
| ***G06F 21/57*** | (2013.01) |
| ***G06F 21/60*** | (2013.01) |
| ***G06F 21/62*** | (2013.01) |
| ***G06F 21/85*** | (2013.01) |
| ***G09C 1/00*** | (2006.01) |
| ***H04L 9/32*** | (2006.01) |
| ***H04L 9/40*** | (2022.01) |
| *G06F 21/51* | (2013.01) |
| *H04L 9/06* | (2006.01) |

(52) U.S. Cl.

CPC ...... *G06F 21/6218* (2013.01); *G06F 21/6281* (2013.01); *G06F 21/85* (2013.01); *G09C 1/00* (2013.01); *H04L 9/32* (2013.01); *H04L 63/126* (2013.01); *G06F 21/51* (2013.01); *H04L 9/0637* (2013.01); *H04L 9/3242* (2013.01); *H04L 63/12* (2013.01)

(58) Field of Classification Search

CPC ...... G06F 21/6281; G06F 21/85; G06F 21/51; G09C 1/00; H04L 9/32; H04L 63/126; H04L 9/0637; H04L 9/3242; H04L 63/12

See application file for complete search history.

(56) References Cited

U.S. PATENT DOCUMENTS

| | | | | |
|---|---|---|---|---|
| 11,656,916 | B2 | 5/2023 | Kakaiya et al. | |
| 2004/0025040 | A1 | 2/2004 | Aoki et al. | |
| 2004/0193757 | A1 | 9/2004 | Creta | |
| 2006/0059574 | A1 | 3/2006 | Fayad et al. | |
| 2008/0082828 | A1 | 4/2008 | Jennings et al. | |
| 2008/0165952 | A1 | 7/2008 | Smith et al. | |
| 2008/0170686 | A1 | 7/2008 | Nemoto et al. | |
| 2009/0217050 | A1 | 8/2009 | Amiel et al. | |
| 2009/0268738 | A1 | 10/2009 | Tchapda | |
| 2013/0185548 | A1 | 7/2013 | Djabarov et al. | |
| 2014/0093074 | A1 | 4/2014 | Gotze et al. | |
| 2014/0380425 | A1 | 12/2014 | Lockett et al. | |
| 2015/0086012 | A1 * | 3/2015 | Chhabra | H04N 21/4143 380/200 |
| 2016/0274918 | A1 | 9/2016 | Moon | |
| 2017/0024584 | A1 | 1/2017 | Chhabra et al. | |
| 2017/0090800 | A1 | 3/2017 | Alexandrovich et al. | |
| 2017/0177293 | A1 * | 6/2017 | Krishnakumar | H04L 63/126 |
| 2019/0042431 | A1 * | 2/2019 | Gerzon | H04L 9/0897 |
| 2023/0110230 | A1 | 4/2023 | Kida et al. | |
| 2023/0315857 | A1 | 10/2023 | Sahita et al. | |

OTHER PUBLICATIONS

Final Office Action, U.S. Appl. No. 16/931,543, Nov. 9, 2022, 15 pages.

Final Office Action, U.S. Appl. No. 17/820,628, Feb. 7, 2024, 11 pages.

Non-Final Office Action, U.S. Appl. No. 15/628,006, May 15, 2019, 6 pages.

Non-Final Office Action, U.S. Appl. No. 15/628,008, Apr. 4, 2019, 27 pages.

Non-Final Office Action, U.S. Appl. No. 16/704,168, Dec. 10, 2021, 6 pages.

Non-Final Office Action, U.S. Appl. No. 16/931,543, Mar. 31, 2022, 17 pages.

Non-Final Office Action, U.S. Appl. No. 17/820,628, Sep. 13, 2023, 9 pages.

Notice of Allowance, U.S. Appl. No. 15/628,006, Sep. 27, 2019, 18 pages.

Notice of Allowance, U.S. Appl. No. 15/628,008, May 28, 2020, 10 pages.

Notice of Allowance, U.S. Appl. No. 15/628,012, Feb. 21, 2019, 8 pages.

Notice of Allowance, U.S. Appl. No. 16/704,168, Apr. 8, 2022, 16 pages.

Notice of Allowance, U.S. Appl. No. 17/820,628, Jul. 3, 2024, 11 pages.

* cited by examiner

TECHNOLOGIES FOR TRUSTED I/O WITH A CHANNEL IDENTIFIER FILTER AND PROCESSOR-BASED CRYPTOGRAPHIC ENGINE

CROSS-REFERENCE TO RELATED APPLICATIONS

This Application is a continuation of and claims the benefit of and priority to U.S. application Ser. No. 16/931,543, entitled TECHNOLOGIES FOR TRUSTED I/O WITH A CHANNEL IDENTIFIER FILTER AND PROCESSOR-BASED CRYPTOGRAPHIC ENGINE, by Reshma Lal, et al., filed Jul. 17, 2020, now pending, which is a continuation of and claims the benefit of and priority to U.S. application Ser. No. 15/628,008, entitled "TECHNOLOGIES FOR TRUSTED I/O WITH A CHANNEL IDENTIFIER FILTER AND PROCESSOR-BASED CRYPTOGRAPHIC ENGINE," by Reshma Lal, et al., filed Jun. 20, 2017, now issued as U.S. Pat. No. 10,789,371, and which claims the benefit of and priority to U.S. Provisional Patent Application Nos. 62/352,356 and 62/352,357, which were both filed Jun. 20, 2016, the entire contents of which are incorporated herein by reference.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
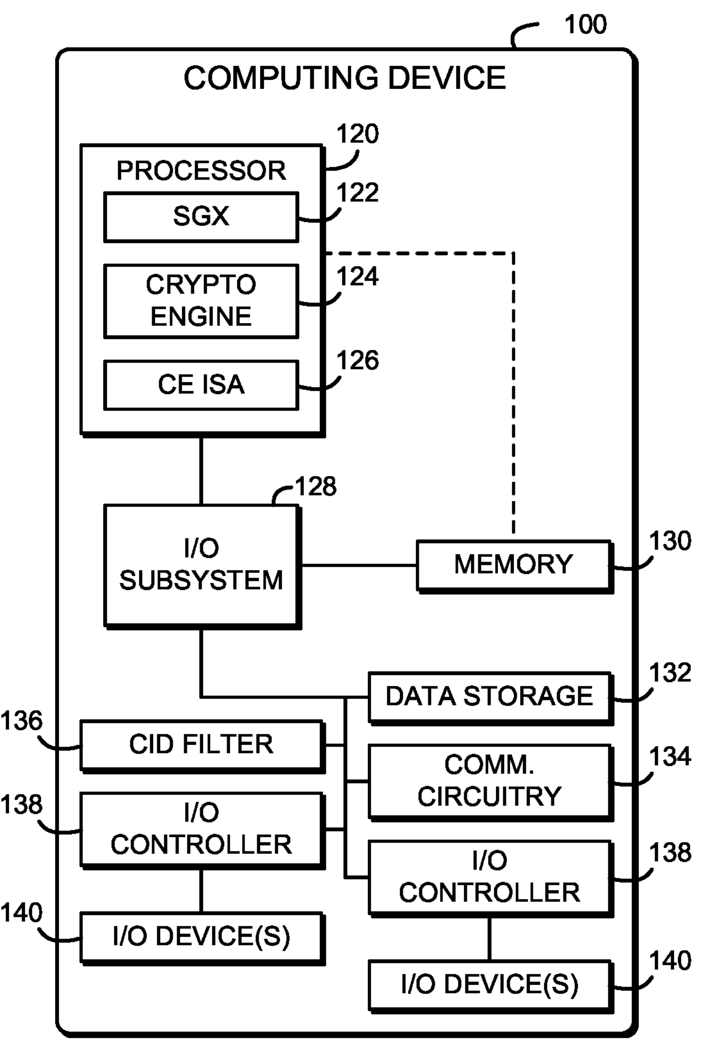
FIG. 1 is a simplified block diagram of at least one embodiment of a computing device for an instruction set architecture for trusted I/O.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for an instruction set architecture for trusted I/O is shown. In use, as described below, the computing device 100 includes processor-based cryptographic engine and inline channel identifier (CID) filter hardware. The computing device 100 establishes a trusted I/O (TIO) processor reserved memory (PRM) region that is inaccessible to software. The processor provides instruction set architecture (ISA) support to allow unprivileged software (e.g., one or more secure enclaves) to bind and wrap channel programming information to the cryptographic engine and the CID filter. The processor ISA support allows privileged software to securely unwrap the programming information to program the CID filter and the cryptographic engine. After programming, the processor ISA support allows the privileged software to securely clean the TIO PRM region of memory to prevent data leaks. After programming, the processor ISA support allows the privileged software to copy and encrypt plaintext I/O data from the TIO PRM region into ordinary kernel and/or user memory buffers without software access to the plaintext I/O data. Thus, the computing device 100 allows for secure programming of the DMA channels that allows untrusted ring-0 software to be in control of the channels that are programmed while still maintaining confidentiality and integrity. Additionally, the computing device 100 allows for secure data movement from the TIO PRM to kernel and user memory buffers, with the plaintext data inaccessible to potentially untrusted system software.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, a data storage device 132, a CID filter 136, and one or more I/O controllers 138. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 142. In particular, as described further below, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 136, described further below. For example, as described further below, the cryptographic engine ISA 126 may include processor features to bind programming instructions to the cryptographic engine 124 and/or the CID filter 136, unwrap bound programming instructions, securely clean the TIO PRM region of the memory 130, and/or securely copy and encrypt data from the TIO PRM region to a kernel I/O buffer.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As described further below, the memory 130 may also include the TIO PRM region. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. The I/O subsystem 128 may further include secure routing support, which may include hardware support to ensure I/O data cannot be misrouted in the I/O subsystem 128 under the influence of rogue software. The secure routing support may be used with the CID filter 136 to provide cryptographic protection of I/O data. Additionally, in some embodiments, the I/O subsystem 128 may form a portion of a system-on-a-chip (SoC) and be incorporated, along with the processor 120, the memory 130, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 136 may be embodied as any hardware component, functional block, logic, or other circuit that performs CID filtering function(s), including filtering I/O transactions based on CIDs inserted by the I/O controllers 138. For example, the CID filter 136 may observe DMA transactions inline, perform test(s) based on the CID and memory address included in the transaction, and drop transactions that fail the test(s). In the illustrative embodiment, the CID filter 136 is included in an SoC with the processor 120 and I/O subsystem 128. In other embodiments, the CID filter 136 may be incorporated in one or more components such as the I/O subsystem 128.

Each of the I/O controllers 138 may be embodied as any embedded controller, microcontroller, microprocessor, functional block, logic, or other circuit or collection of circuits capable of performing the functions described herein. In some embodiments, one or more of the I/O controllers 138 may be embedded in another component of the computing device 100 such as the I/O subsystem 128 and/or the processor 120. Additionally or alternatively, one or more of the I/O controllers 138 may be connected to the I/O subsystem 128 and/or the processor 120 via an expansion bus such as PCI Express (PCIe) or other I/O connection. As described above, the I/O controllers 138 communicate with one or more I/O devices 140, for example over a peripheral communications bus (e.g., USB, Bluetooth, etc.). The I/O devices 140 may be embodied as any I/O device, such as human interface devices, keyboards, mice, touch screens, microphones, cameras, and other input devices, as well as displays and other output devices. As described above, the I/O controllers 138 and associated DMA channels are uniquely identified using identifiers called channel identifiers (CIDs). Each I/O controller 138 may assert an appropriate CID with every DMA transaction, for example as part of a transaction layer packet (TLP) prefix, to uniquely identify the source of the DMA transaction and provide liveness protections. The CID also enables the isolation of I/O from different devices 140.

Figure 2:
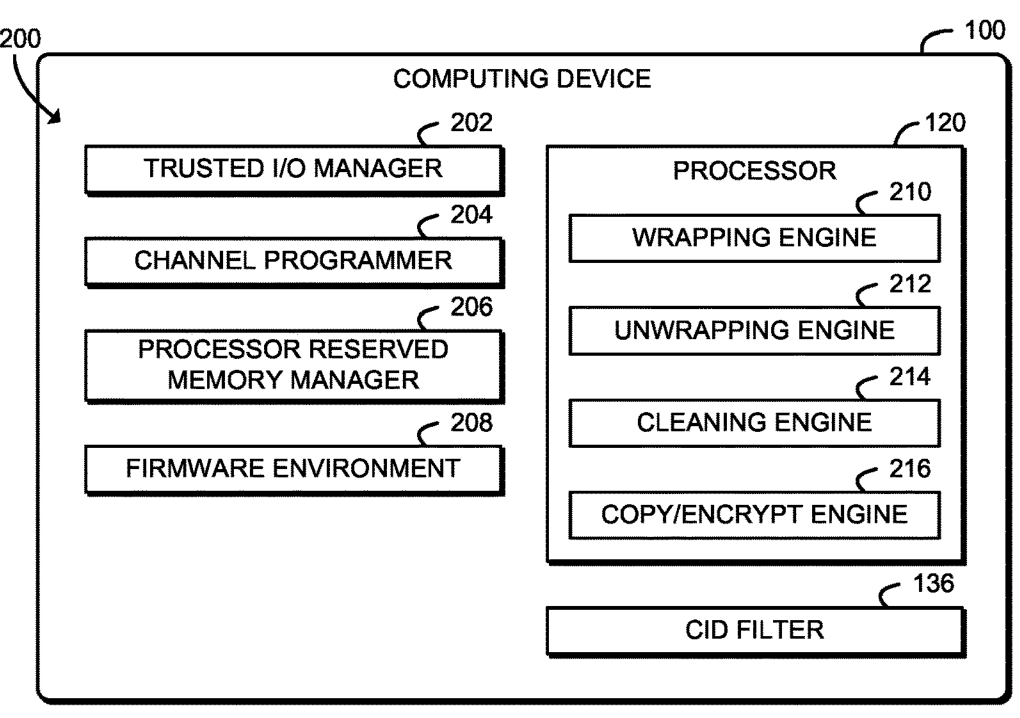
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes trusted I/O manager 202, a channel programmer 204, a processor reserved memory manager 206, a firmware environment 208, a wrapping engine 210, an unwrapping engine 212, a cleaning engine 214, and a copy/encrypt engine 216. The various components of the environment 200 may be embodied as hardware, firmware, software, or a combination thereof. As such, in some embodiments, one or more of the components of the environment 200 may be embodied as circuitry or collection of electrical devices (e.g., trusted I/O manager circuitry 202, channel programmer circuitry 204, processor reserved memory manager circuitry 206, firmware environment circuitry 208, wrapping engine circuitry 210, unwrapping engine circuitry 212, cleaning engine circuitry 214, and/or copy/encrypt engine circuitry 216). It should be appreciated that, in such embodiments, one or more of the trusted I/O manager circuitry 202, the channel programmer circuitry 204, the processor reserved memory manager circuitry 206, the firmware environment circuitry 208, the wrapping engine circuitry 210, the unwrapping engine circuitry 212, the cleaning engine circuitry 214, and/or the copy/encrypt engine circuitry 216 may form a portion of the processor 120, the I/O subsystem 128, the CID filter 136, and/or other components of the computing device 100. In particular, as shown in FIG. 2, the wrapping engine 210, the unwrapping engine 212, the cleaning engine 214, the copy/encrypt engine 216 may be embodied as digital logic, microcode, or other resources of the processor 120. Additionally, in some embodiments, one or more of the illustrative components may form a portion of another component and/or one or more of the illustrative components may be independent of one another.

The firmware environment 208 is configured to assign a trusted I/O (TIO) processor reserved memory (PRM) region in the memory 130. As described further below, the TIO PRM region may include processor reserved memory regions that are each associated with a particular channel identifier. The processor 120 is configured to prevent access by software components (unprivileged or privileged) to the TIO PRM region.

The channel programmer 204 is configured to generate, by an unprivileged software component, programming information for the CID filter 136. The programming information is indicative of, among other data, a channel identifier and a channel key. The channel programmer 204 is further configured to invoke, by the unprivileged software component, an unprivileged processor instruction with the programming information as a parameter. The unprivileged processor may be embodied as an EBIND instruction. In some embodiments, the processor 120 may establish a secure enclave with the secure enclave support 122, and the secure enclave may include the unprivileged software component.

The wrapping engine 210 is configured to generate, by the processor 120, wrapped programming information based on the programming information in response to invocation of the unprivileged processor instruction (i.e., the EBIND instruction). The wrapped programming information includes an encrypted channel key and is indicative of a processor reserved memory region that is associated with the channel identifier of the programming information.

The channel programmer 204 is further configured to provide, by the unprivileged software component, the wrapped programming information to a privileged software component. The privileged software component may be embodied as, for example, a kernel mode driver of the computing device 100. The processor 120 is further configured to prevent the privileged software component from accessing the processor reserved memory region associated with the channel identifier. The channel programmer 204 is further configured to invoke, by the privileged software component, a privileged processor feature with the wrapped programming information as a parameter. The privileged processor feature may be embodied as a TIO_UNWRAP instruction of the processor 120. The channel programmer 204 may be further configured to verify, by the privileged software component, the wrapped programming information and to invoke the privileged processor feature in response to verification of the wrapped programming information. The channel programmer 204 may be further configured to read, by the privileged software component, a cryptographic response from the processor 120 in response to invocation of the privileged processor feature.

The unwrapping engine 212 is configured to program, by the processor 120, the CID filter 136 with the channel identifier and a memory range of the processor reserved memory region associated with the channel identifier in response to invocation of the privileged processor feature (i.e., the TIO_UNWRAP instruction).

The processor reserved memory manager 206 is configured to invoke, by the privileged software component, a privileged processor feature with the memory range of the processor reserved memory region associated with the channel identifier as a parameter. The privileged processor feature may be embodied as a TIO_PRM_CLEANUP instruction of the processor. The cleaning engine 214 is configured to securely clear, by the processor 120, the memory range of the processor reserved memory region in response to invocation of the privileged processor feature (i.e., the TIO_PRM_CLEANUP instruction).

The trusted I/O manager 202 may be configured to intercept, by a privileged software component, an I/O request that is indicative of a privileged memory buffer. The privileged software component may be embodied as, for example, a kernel mode filter driver of the computing device 100. The trusted I/O manager 202 may be further configured to allocate, by the filter driver, a shadow memory buffer located at a memory address in the processor reserved memory region that is associated with a channel identifier associated with the I/O request, and to generate, by the filter driver, a replacement I/O request indicative of the memory address in response to allocating the shadow memory buffer. An I/O controller 138 associated with the replacement I/O request may generate an I/O transaction in response to generation of the replacement I/O request.

The CID filter 136 is configured to verify the I/O transaction. The I/O transaction includes a channel identifier and the memory address of the shadow buffer. Verifying the I/O transaction may include verifying that the memory address is included in a processor reserved memory region that is associated with the channel identifier.

The trusted I/O manager 202 is further configured to invoke, by the privileged software component of the computing device, a privileged processor feature in response to verification of the I/O transaction by the CID filter 136. The privileged processor feature may be embodied as a TIO_COPY_ENCRYPT instruction of the processor 120.

The copy/encrypt engine 216 is configured to encrypt, by the processor 120, I/O data at the memory address in the shadow buffer with a channel key to generate encrypted data in response to invocation of the privileged processor feature (i.e., the TIO_COPY_ENCRYPT instruction). The copy/encrypt engine 216 is further configured to copy, by the processor 120, the encrypted data to the privileged memory buffer associated with the original I/O request. The privileged memory buffer is located outside of the TIO PRM region. The copy/encrypt engine 216 may be further configured to determine, by the processor 120, whether the processor reserved memory region associated with the channel identifier has been securely cleared in response to invocation of the privileged processor feature. The I/O data may be encrypted and copied only if the processor reserved memory region has been securely cleared. The copy/encrypt engine 216 may be further configured to indicate, by the processor 120, an error condition in response to determining that the processor reserved memory region has not been securely cleared.

The trusted I/O manager 202 may be further configured to copy, by the privileged software component, the encrypted data from the privileged memory buffer to an unprivileged memory buffer. For example, the encrypted data may be passed through a system I/O stack to the unprivileged memory buffer. The trusted I/O manager 202 may be further configured to decrypt, by an unprivileged software component, the encrypted data in the unprivileged memory buffer in response to copying the encrypted data. The unprivileged software component may be embodied as, for example, a secure enclave established with the secure enclave support 122 of the processor 120.

Figure 3:
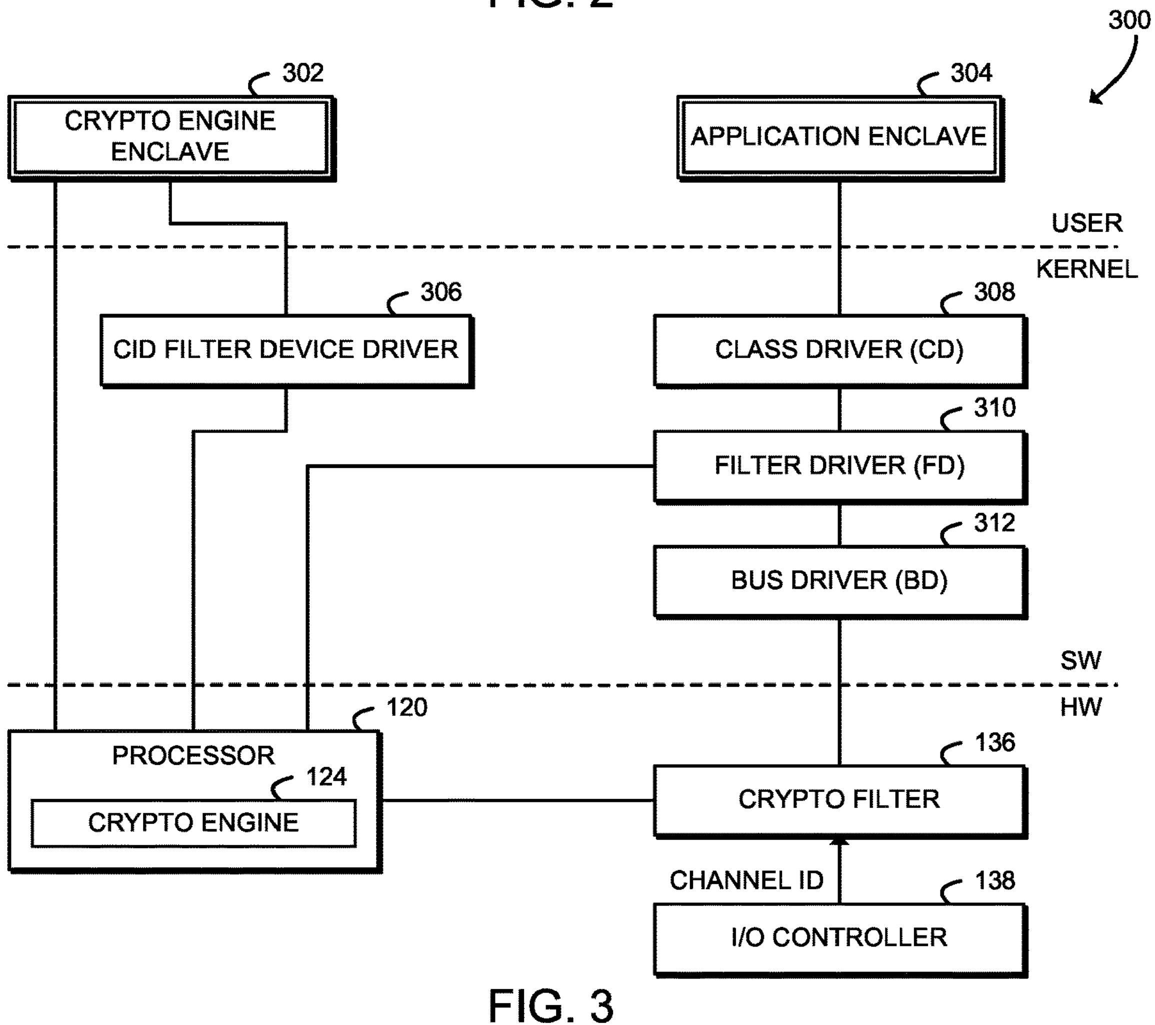
FIG. 3 is a simplified block diagram of at least one embodiment of a system I/O stack that may be established by the computing device of FIGS. 1 and 2.

Referring now to FIG. 3, diagram 300 illustrates a system I/O stack that may be established by the computing device 100. As shown, the diagram 300 includes hardware and software components, and the software components are either kernel-mode (e.g., privileged or ring-0 code) or user mode (e.g., unprivileged or ring-3 code). The unprivileged software components include a crypto engine enclave (CEE) 302 and an application enclave 304. Each of the enclaves 302, 304 may be embodied as a secure enclave protected with the secure enclave support 122 of the processor 120, and thus may be considered trusted components. The privileged software includes a CID filter device driver 306 and an I/O stack that includes a class driver 308, a filter driver 310, and a bus driver 312. Each of the drivers 306 through 312 may be embodied as kernel-mode drivers, loadable kernel modules, monolithic kernel code, or other privileged code. However, the drivers 306 through 312 may not be protected with the secure enclave support 122 and thus may be considered untrusted components from the perspective of the CEE 302 and/or the application enclave 304.

In use, as described further below in connection with FIGS. 5A and 5B, the CEE 302 communicates with the CID filter driver 306 to securely program the crypto engine 124 of the processor 120 and the CID filter 136 to perform trusted I/O over a DMA channel. The crypto engine 124 and the CID filter 136 may be programmed with, for example, a channel identifier, a channel encryption key, and a range in the TIO processor reserved memory (PRM) region associated with the channel identifier. The channel encryption key may be shared with the application enclave 304. As described further below in connection with FIGS. 6A and 6B, the filter driver 310 intercepts an I/O request and replaces the memory address of the I/O request with a shadow buffer in the TIO PRM range associated with the channel identifier, and then invokes the processor 120 to copy and encrypt the data from the shadow buffer to an ordinary kernel buffer. The encrypted data is passed through the I/O stack (e.g., through the class driver 308) to the application enclave 304, which may decrypt the data with the channel encryption key.

Although illustrated with a particular structure in FIG. 3, it should be understood that in some embodiments, the computing device 100 may use a different driver and/or enclave structure. For example, in some embodiments, one or more privileged software components such as the CID filter device driver 306 and the filter driver 310 may be combined into a single privileged software component. As another example, in some embodiments, the operating system kernel may use a different driver model for I/O devices and thus may not divide functionality into a stack of class driver 308, filter driver 310, and bus driver 312. Similarly, in some embodiments, the non-privileged software components such as the CEE 302 and the application enclave 304 may be combined or otherwise organized in a different structure. However, as described further below, the cryptographic engine ISA 126 of the processor 120 may enforce the separation of functions and responsibilities between privileged (e.g., ring-0 or kernel) software components and unprivileged (e.g., ring-3 or user) software components.

Figure 4:
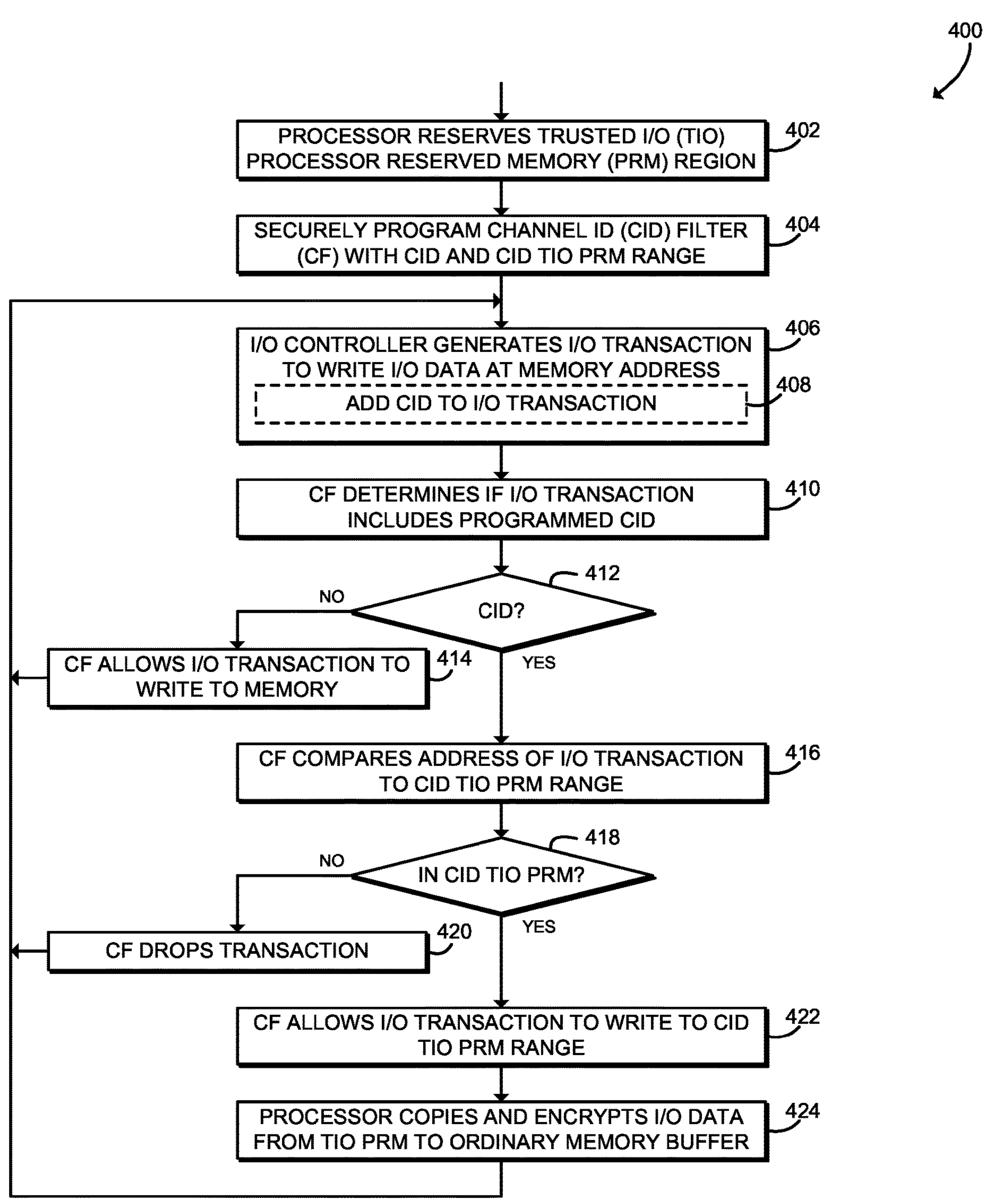
FIG. 4 is a simplified flow diagram of at least one embodiment of a method for protecting I/O data that may be executed by the computing device of FIGS. 1-3.

Referring now to FIG. 4, in use, the computing device 100 may execute a method 400 for protecting I/O data. It should be appreciated that, in some embodiments, the operations of the method 400 may be performed by one or more components of the environment 200 of the computing device 100 as shown in FIG. 2. The method 400 begins in block 402, in which the processor 120 of the computing device 100 reserves a trusted I/O (TIO) processor reserved memory (PRM) region in the memory 130. For example, one or more TIO PRM range registers may be set to define the TIO PRM range in memory. Continuing that example, the processor 120 may include a TIO PRM base register and a TIO PRM size register, which together define the TIO PRM range. After reserving the TIO PRM range, the processor 120 may generate a page fault, exception, or other error in response to a software attempt to access the TIO PRM range. As another example, in some embodiments the processor 120 may prevent access to the TIO PRM range without generating an error, for example by excluding the TIO PRM from a system memory map or other memory layout of the computing device 100. The TIO PRM region may be reserved by system firmware, as described further below in connection with FIGS. 5A and 5B.

In block 404, the processor 120 of the computing device 100 securely programs the CID filter 136 with a channel identifier (CID) associated with a secure I/O channel and a range in the TIO PRM region associated with the CID, called a CID TIO PRM range. In response to being programmed, the CID filter 136 may store the CID, the associated CID TIO PRM range, and/or other programming data in a content-addressable memory (CAM) table. The CID filter 136 may be securely programmed using one or more instructions or other features of the processor 120. One embodiment of a method and instruction set architecture (ISA) for securely programming the CID filter 136 is described below in connection with FIGS. 5A and 5B.

In block 406, an I/O controller 138 of the computing device 100 generates an I/O transaction. The I/O transaction identifies a memory address in the memory 130 as well as plaintext I/O data, which may be received from an I/O device 140. The I/O transaction may be embodied as, for example, a PCI DMA transaction. In some embodiments, in block 408 the I/O controller 138 may add a CID to the I/O transaction. For example, the I/O controller 138 may add a CID to transactions that originate from a TIO-capable I/O device 140. The CID may be included in the I/O transaction, for example, in a TLP prefix of a PCI transaction.

In block 410, the CID filter 136 intercepts the I/O transaction and determines whether the I/O transaction includes a CID that has been programmed to the CID filter 136. In block 412, the CID filter 136 checks whether the I/O transaction includes a CID that has been programmed. If not, the method 400 branches to block 414, in which the CID filter 136 allows the I/O transaction to write to the memory 130 without performing any TIO-related security checks. Thus, the CID filter 136 may allow unsecure channels (or I/O controllers 138 that do not support CIDs) to communicate unprotected I/O data with the memory 130. After allowing the I/O transaction, the method 400 loops back to block 406 to continue generating and filtering I/O transactions. Referring back to block 412, if the I/O transaction includes a CID that has been programmed, the method 400 advances to block 416.

In block 416, the CID filter 136 compares the address of the I/O transaction to the CID TIO PRM range that has been programmed for the CID of the transaction. In particular, the CID filter 136 verifies that the CID has been programmed and that the address of the I/O transaction is within the CID TIO PRM range that was previously programmed. For example, the CID filter 136 may look up the CID in the CAM table and then verify the associated address. In block 418, the CID filter 418 checks whether the address is within the CID TIO PRM range. If not, the method 400 branches to block 420, in which the CID filter 136 drops the I/O transaction, preventing the I/O data from being written to the memory 130. In some embodiments, the CID filter 136 may also generate an error signal or other indication that the I/O transaction was dropped. After dropping the I/O transaction, the method 400 loops back to block 406 to continue generating and filtering I/O transactions. Referring back to block 418, if the memory address is within the CID TIO PRM range, the method 400 advances to block 422.

In block 422, the CID filter 136 allows the I/O transaction to write the plaintext I/O data to the memory address within the CID TIO PRM range. As described above, the TIO PRM is protected by the processor 120 from access by software of the computing device 100. Thus, even though the I/O data is written to the memory 130 in plaintext, the I/O data is protected from potential malicious software.

In block 424, the processor 120 copies and encrypts the I/O data from the CID TIO PRM to an ordinary memory buffer, which may be accessible by privileged and/or unprivileged software of the computing device 100. The processor 120 encrypts the I/O data with a channel key associated with the CID of the I/O transaction. The encrypted I/O data may be decrypted, for example, by trusted software that possesses the appropriate channel key. The I/O data may be securely copied and encrypted using one or more instructions or other processor features of the processor 120. One potential embodiment of a method and ISA for protecting I/O data is described below in connection with FIGS. 6A and 6B.

Figure 5A:
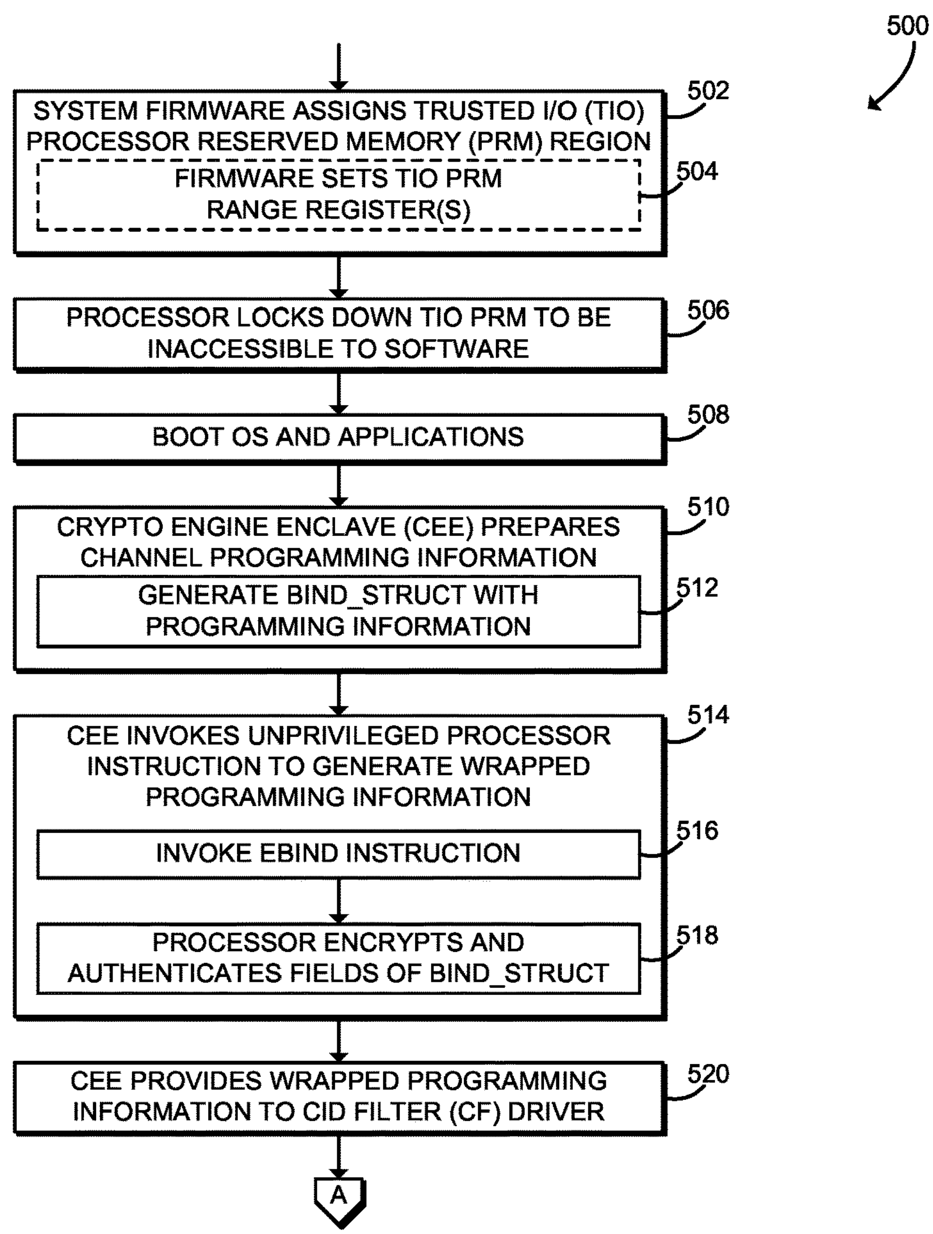
FIGS. 5A and 5B are a simplified flow diagram of at least one embodiment of a method for programming a trusted I/O channel that may be executed by the computing device of FIGS. 1-3.
Figure 5B:
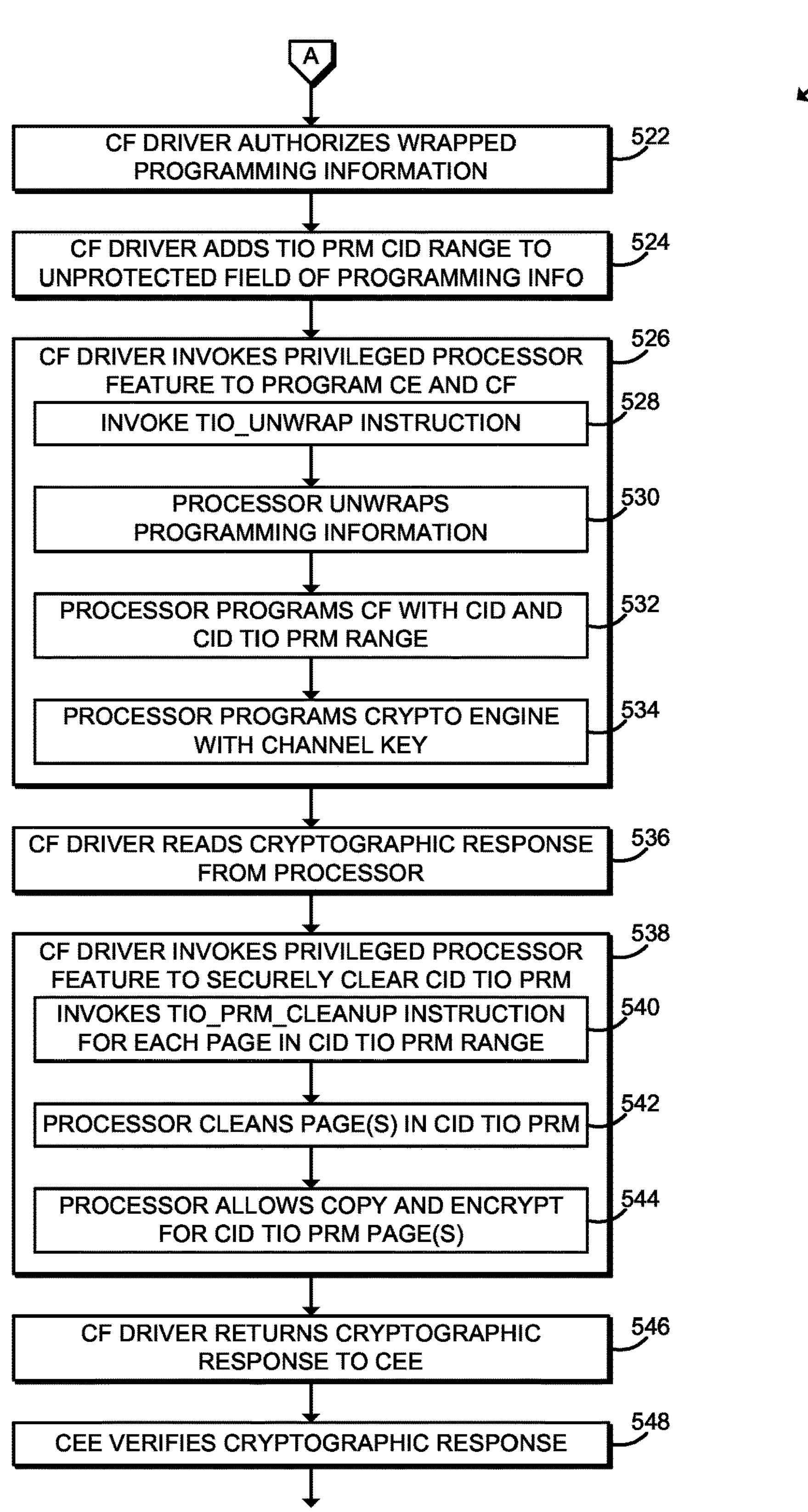

Referring now to FIGS. 5A and 5B, in use, the computing device 100 may execute a method 500 for programming a TIO channel. It should be appreciated that, in some embodiments, the operations of the method 500 may be performed by one or more components of the environment 200 of the computing device 100 as shown in FIG. 2. The method 500 begins in block 502, in which system firmware of the computing device 100 assigns a trusted I/O (TIO) processor reserved memory (PRM) region in the memory 130. In some embodiments, in block 504, the firmware of the computing device 100 may set one or more TIO PRM range registers to define the TIO PRM range in memory. For example, the processor 120 may include a TIO PRM base register and a TIO PRM size register, which together define the TIO PRM range. In block 506, the processor 120 locks down the TIO PRM range to be inaccessible to software. For example, after being locked down, the processor 120 may generate a page fault, exception, or other error in response to a software attempt to access the TIO PRM range. As another example, in some embodiments the processor 120 may prevent access to the TIO PRM range without generating an error, for example by excluding the TIO PRM from a system memory map or other memory layout of the computing device 100.

Because the TIO PRM is locked down by platform firmware (e.g., UEFI firmware, ACPI firmware, BIOS, or other firmware), the platform firmware executed between platform reset and the point that the TIO PRM is cleaned may be inside a TIO application's trusted code base (TCB). Thus, that part of the platform firmware may be integrity protected, for example using Intel® Boot Guard technology.

As a security requirement to protect data confidentiality, for a given "memory cell" within the TIO PRM range, platform firmware has to either keep the memory cell as part of TIO PRM in subsequent boots, or securely clean the memory cell before allowing accesses from untrusted software entities/components. The platform firmware may store TIO PRM and memory controller settings in UEFI variables so that the platform firmware can identify if any of those settings have changed between boots, and clean memory cells as needed. After configuring MC and TIO PRM, the platform firmware may store the settings in UEFI variables and integrity-protect the settings using a trusted platform module (TPM). Thus, the computing device 100 may detect if malicious software has tampered with the UEFI variables (which may be stored on writable flash regions) to fool the platform firmware into skipping cleaning. The computing device may use any integrity protection technique provided by the TPM, such as using the TPM nonvolatile (NV) store or using a sealed MAC key. For the NV store, the settings or the hash of the settings may be stored in a TPM NV with a policy that allows write only at the firmware stage where MC and TIO PRM are configured. At boot, the platform firmware may check the MC routing and TIO PRM range settings against the stored copy and skip cleaning the TIO PRM range only if the settings match. An integrity failure of the stored settings should be considered a setting mismatch. For the sealed MAC key, an HMAC key may be created in the TPM with the policy to allow access by the firmware stage in which the MC and TIO PRM settings are configured. The MC and TIO PRM settings are stored in UEFI variables, along with the MAC. At boot, the platform firmware verifies the stored copy before comparing it against the settings calculated during the current boot. MAC failure is also considered a mismatch, and will cause memory to be securely cleaned. On a setting mismatch (i.e., if the location of the TIO PRM has changed since the previous boot), the platform firmware may scrub only those memory locations previous included in the TIO PRM, assuming that the stored settings have passed an integrity check. Of course, in practice the whole memory could be simply scrubbed to reduce the complexity in platform firmware code, given that memory geometry change is expected to be a rare event so should not constitute a performance concern.

After locking down the TIO PRM range, in block 508 the computing device 100 boots an operating system and one or more applications. After boot, the computing device 100 may load one or more operating system drivers or other privileged software components, such as the CID filter device driver 306, the class driver 308, the filter driver 310, and the bus driver 312. Similarly, the computing device 100 may load one or more secure enclaves or other unprivileged software components, such as the CEE 302 and the application enclave 304.

In block 510, the CEE 302 prepares channel programming information for a trusted I/O channel. The TIO channel corresponds to DMA communications with a peripheral device 140 via the associated I/O controller 138. The channel programming information may include: the channel identifier (CID) for the channel being programmed, a channel programming command (e.g., protect a channel, unprotect a channel, reprogram key), a message descriptor, including the message characteristics for data generated from a channel (e.g., maximum message size, header description); one or more channel key(s) associated with the channel to be used for protecting the channel data, and a response key used for generating cryptographic responses. In block 512, the CEE 302 prepares a BIND_STRUCT object that includes the programming information. The BIND_STRUCT is a data structure that is partially populated by software and partially populated by hardware, as described further below. One potential embodiment of the BIND_STRUCT is described below in Table 1. In that embodiment, various items of the channel programming information may be included in the target specific encrypted data BTENCDATA and/or the target specific data BTDATA. In particular, the channel key may be included in the BTENCDATA for protection from untrusted software (e.g., the CID filter device driver 306, the operating system kernel, and/or other software outside of the CEE 302).

TABLE 1

BIND_STRUCT

| Name of Offset | Size (bytes) | Description | Set By |
|---|---|---|---|
| MAC | 16 | MAC on encrypted data, target data, ID, SVN, Nonce, sequence ID, and size fields | Hardware |
| BSTRUCTSIZE | 2 | Size of BIND_STRUCT, e.g., 256 | Software |
| BTENCSIZE | 2 | Size of encrypted target data, e.g., 48 | Software |
| BTDATASIZE | 2 | Size of target data, e.g., 64 | Software |
| BTUPDATASIZE | 2 | Size of target specific data not encrypted or integrity processed, e.g., 16 | Software |
| BTID | 4 | Target device, e.g., CF | Software |
| BTSVN | 4 | Target Security version number | Software |
| NONCE | 8 | Nonce for Authenticated Responses | Software |
| SEQID | 8 | Seed for generating Initialization Vector (IV) | Hardware |
| VERSION | 4 | BIND_STRUCT version, e.g., must be 1 | Software |
| RSVD | 12 | Reserved, must be zero | Software |
| BTENCDATA | BTENCSIZE | Target specific encrypted data | Software |
| BTDATA | BTDATASIZE | Target specific data | Software/ Hardware |

TABLE 1-continued

| BIND_STRUCT | | | |
|---|---|---|---|
| Name of Offset | Size (bytes) | Description | Set By |
| BTUPDATA | BTUPDATASIZE | Target specific data that is not encrypted or integrity protected | Software |
| RSVD | BSTRUCTSIZE − (52 + BTENCSIZE + BTDATASIZE + BTUPDATASIZE) | Reserved, must be zero | Software |

In some embodiments, the CEE 302 may generate a channel key that is based on a recovery policy supplied when the channel is initially programmed. Later, the CEE 302 may recover the channel key if the recovery policy conditions are met. For example, after an application enclave crashes and leaves the channel encrypted and inaccessible (because no other entity has access to the channel key), the CEE 302 may recover the channel key to program the channel out of encryption if the recovery policy conditions are satisfied (for example, if a delegate provides confirmation). In those embodiments, the CEE 302 may derive the channel key from a random part and a policy part, using EGETKEY as the key derivation function (KDF). The random part may be a random nonce generated by the CEE 302, which may be stored by any software entity (trusted or untrusted) for later use. The policy part may be provided by an authorized entity that has attested to the policy as part of its attestation to the whole TIO stack topology. The policy part may be illustratively embodied as a cryptographic hash of one or more policy components that should be enforced, such as one or more constants, protection states, enclave identifiers (e.g., MR_ENCLAVE or MR_SIGNER), or other policy conditions. To derive the channel key, the CEE 302 passes the nonce and the policy part to EGETKEY, which returns the channel key. To recover the channel key, the requesting untrusted code supplies the CEE 302 with the policy components, and the CEE 302 determines the policy part based on the policy components. The CEE 302 passes the nonce and the derived policy part to EGETKEY, which will return the same channel key if the untrusted code is honest (i.e., if the policy components are correct).

In block 514, the CEE 302 invokes an unprivileged processor instruction to generate wrapped programming information based on the unwrapped channel programming information. The wrapped programming information is bound to the CID filter 136. In particular, parts of the channel programming information may be encrypted and integrity-protected. In block 516, the CEE 302 invokes an EBIND instruction, with the BIND_STRUCT as a parameter.

Illustratively, EBIND is a ring 3 instruction, a leaf of ENCLU. In response to invocation of the EBIND instruction, in block 518 the processor 120 encrypts and/or authenticates various fields of the BIND_STRUCT data structure. For example, the as shown in Table 1, the processor 120 may encrypt the BTENCDATA field and generate a MAC over other fields, including the BTENCDATA, BTDATA, the target device ID, security version number, nonce, sequence ID, size fields, and/or other fields. EBIND uses an ephemeral key-wrapping key (KWK) to perform its cryptographic operations. The KWK may be sampled by a platform authenticated code module and provided to microcode and is cleared on reset. Consequently, wrapped blobs generated by EBIND do not survive across reset. Thus, EBIND allows an enclave to wrap a key, bind it to the specified target, and include other target-specific information such as CID, command, CID TIO PRM, etc. Output of the EBIND instruction is a wrapped blob that can be programmed into the target (i.e., the CID filter 136) to establish a shared key between the enclave and the target.

In block 520, the CEE 302 provides the wrapped programming information to the CID filter device driver 306. The CEE 302 may use any appropriate technique to pass the wrapped programming information, for example invoking a system call, API, or other interface to the CID filter device driver 306. The wrapped programming information may be passed as a binary blob of data, as a BIND_STRUCT data structure including encrypted data, or in any other appropriate format.

Referring now to FIG. 5B, in block 522, the CID filter device driver 306 authorizes programming with the wrapped programming information. The CID filter device driver 306 may perform any supervisory or other policy-based determination to determine whether to authorize the wrapped programming information. For example, the CID filter device driver 306 may examine various unencrypted fields of the wrapped programming information such as the channel identifier or the channel programming command to determine whether to allow the programming information. Thus, privileged software (i.e., the CID filter device driver 306) may control allocation of TIO channels. Note that the CID filter device driver 306 (and other privileged software) cannot decrypt encrypted fields of the wrapped programming information (such as the channel encryption keys) and thus cannot access encrypted I/O data for the TIO channel. If the CID filter device driver 306 determines that the wrapped programming information is not authorized, the CID filter device driver 306 may return an error message or otherwise prevent programming the TIO channel. If the CID filter device driver 306 authorizes the wrapped programming information, the method 500 advances to block 524.

In block 524, the CID filter device driver 306 adds the TIO PRM CID range to an unprotected field of the wrapped programming information. The TIO PRM CID range may be embodied as the base and top of the TIO PRM range associated with the channel being programmed. The TIO PRM CID range may be added to a field of the BIND_STRUCT object that is not encrypted or integrity protected, such as the BTUPDATA field described above.

In block 526, the CID filter device driver 306 invokes a privileged processor feature to program the cryptographic engine 124 and the CID filter 136. The wrapped programming information is decrypted, verified, and programmed to the cryptographic engine 124 and the CID filter 136. The privileged processor feature may be embodied as an instruction, model-specific register (MSR), or other feature of the processor 120. In block 528, the CID filter device driver 306 invokes a TIO_UNWRAP instruction of the processor 120.

The CID filter device driver 306 may provide the wrapped BIND_STRUCT to the processor as well as an UNWRAP_RESPONSE_STRUCT to store a cryptographic response. The TIO_UNWRAP instruction may be restricted to ring-0 software or other privileged software such as the CID filter device driver 306. In response to invocation of the TIO_UNWRAP instruction, in block 530 the processor 120 unwraps the programming information. The processor 120 may decrypt various fields of the BIND_STRUCT using the same ephemeral key-wrapping key (KWK) used by the EBIND instruction. For example, the processor 120 may decrypt one or more channel encryption keys included in the BIND_STRUCT. The processor 120 may also verify that the MAC included in the BIND_STRUCT is valid, to prevent alterations to the programming information. In block 532, the processor 120 programs the CID filter 136 with the channel identifier (CID) and the CID TIO PRM range for the TIO channel. The CID TIO PRM range identifies a particular range (e.g., base address and size) within the TIO PRM range of memory 130 that may be used for I/O data associated with the particular CID. The CID filter 136 may include a content-addressable memory (CAM) table that includes the CIDs and associated CID TIO PRM range. As described further below, in use the CID filter 136 may verify that the CID included in an I/O transaction has been programmed and that the memory address of the I/O transaction is within the correct CID TIO PRM range. In block 534, the processor 120 programs the cryptographic engine 124 with the channel encryption key(s) associated with the CID. Similar to the CID filter 136, the cryptographic engine 124 may access a CAM table or other data table that relates the CID to the associated channel encryption key(s).

In block 536, after invoking the privileged processor feature to program the cryptographic engine 124 and the CID filter 136, in block 536 the CID filter device driver 306 reads a cryptographic response from the processor 120. The cryptographic response indicates whether the TIO channel was successfully programmed. As described above, the CID filter device driver 306 may provide an UNWRAP_RESPONSE_STRUCT to the processor 120 to store the cryptographic response. One potential embodiment of an UNWRAP_RESPONSE_STRUCT is described below in Table 2. As shown, the response may indicate whether the programming information was successfully unwrapped, whether the TIO channel was successfully programmed, or other information. The cryptographic response may be authenticated or otherwise generated using a key included in the BIND_STRUCT to allow trusted software (e.g., the crypto engine enclave 302) to securely verify that the TIO channel was programmed.

TABLE 2

UNWRAP_RESPONSE_STRUCT

| Field | Size | Description |
|---|---|---|
| RSP_STRUCT_SIZE | 2 B | Size of the response structure. Must be 64 B aligned |
| CRSP_SIZE | 2 B | Authenticated response size |
| VERSION | 4 B | Structure version, e.g., must be 1 |
| UNWRAP_STATUS | 4 B | Status of unwrap request (e.g., SUCCESSFUL_UNWRAP, INTEGRITY_FAILURE) |
| Target-specific response | CSRP_SIZE | Cryptographic Response (e.g., CH_PROG_SUCCESS, CH_ALREADY_PROG) |
| RSVD | RSP_STRUCT_SIZE − (8 + CRSP_SIZE) | Reserved for Future use |

In block 538, after reading the cryptographic response, the CID filter device driver 306 invokes a privileged processor feature to securely clear the CID TIO PRM range. Securely clearing the CID TIO PRM prevents potential leakage of sensitive information already stored in the CID TIO PRM range. Thus, the processor 120 may not allow data to leave the CID TIO PRM range until it has been securely cleared. The privileged processor feature may be embodied as an instruction, model-specific register (MSR), or other feature of the processor 120. In block 540, the CID filter device driver 306 invokes a TIO_PRM_CLEANUP instruction for each memory page in the CID TIO PRM range. TIO_PRM_CLEANUP provides ring-0 software or other privileged software such as the CID filter device driver 306 the ability to carry out the cleanup of the CID TIO PRM assigned to a channel before the channel data can be consumed by an enclave. Thus, TIO_PRM_CLEANUP may ensure that untrusted software cannot cause data leaks due to the shared TIO PRM with plaintext data. To clean up memory pages associated with a CID, the CID filter device driver 306 may provide the processor 120 with a CLEANUP_PARAM_STRUCTURE data structure as shown below in Table 3. In response to invocation of the TIO_PRM_CLEANUP instruction, in block 542, the processor 120 cleans one or more memory pages in the CID TIO PRM. The processor 120 may use any technique to clean the memory pages, such as zeroing the pages, securely overwriting the pages, or otherwise clearing the contents of the memory pages. The CID filter device driver 306 and/or the processor 120 may continue to clean memory pages until the entire CID TIO PRM has been cleaned, which may be indicated with the STATUS field of the CLEANUP_PARAM_STRUCT. In block 544, after the pages have been cleaned, the processor 120 allows a copy and encrypt operation for the CID TIO PRM memory pages. Attempts to copy and encrypt data from the CID TIO PRM before cleaning is complete may cause the processor 120 to generate an error.

TABLE 3

CLEANUP_PARAM_STRUCT

| Field | Size | Description |
|---|---|---|
| CID | 2 | Channel ID of the channel to be cleaned |
| STATUS | 2 | Status of the cleanup (e.g., CONTINUE_CLEANUP, CLEANUP_DONE) |
| VERSION | 4 | Structure version, e.g., must be 1 |
| RSVD | 4 | Reserved, must be zero |

After cleaning the CID TIO PRM, in block 546, the CID filter device driver 306 returns the cryptographic response to the CEE 302. The CID filter device driver 306 may, for example, return the UNWRAP_RESPONSE_STRUCT to the CEE 302. In block 548, the CEE 302 verifies the cryptographic response. As described above, the cryptographic response may be authenticated or otherwise generated using a key included in the BIND_STRUCT. Thus, the CEE 302 may verify that the cryptographic response is authentic and was generated by the target of the BIND_STRUCT (e.g., the processor 120 and/or the CID filter 136). The CEE 302 may allow communication over the TIO channel only if the cryptographic response indicates that programming was successful. After verifying the cryptographic response, the method 500 is completed. The computing device 100 may go on to protect I/O data transmitted over the TIO channel as described further below in connection with FIGS. 6A and 6B. In some embodiments, the computing device 100 may restart the method 500 to program or and/or re-program additional TIO channels.

Figure 6A:
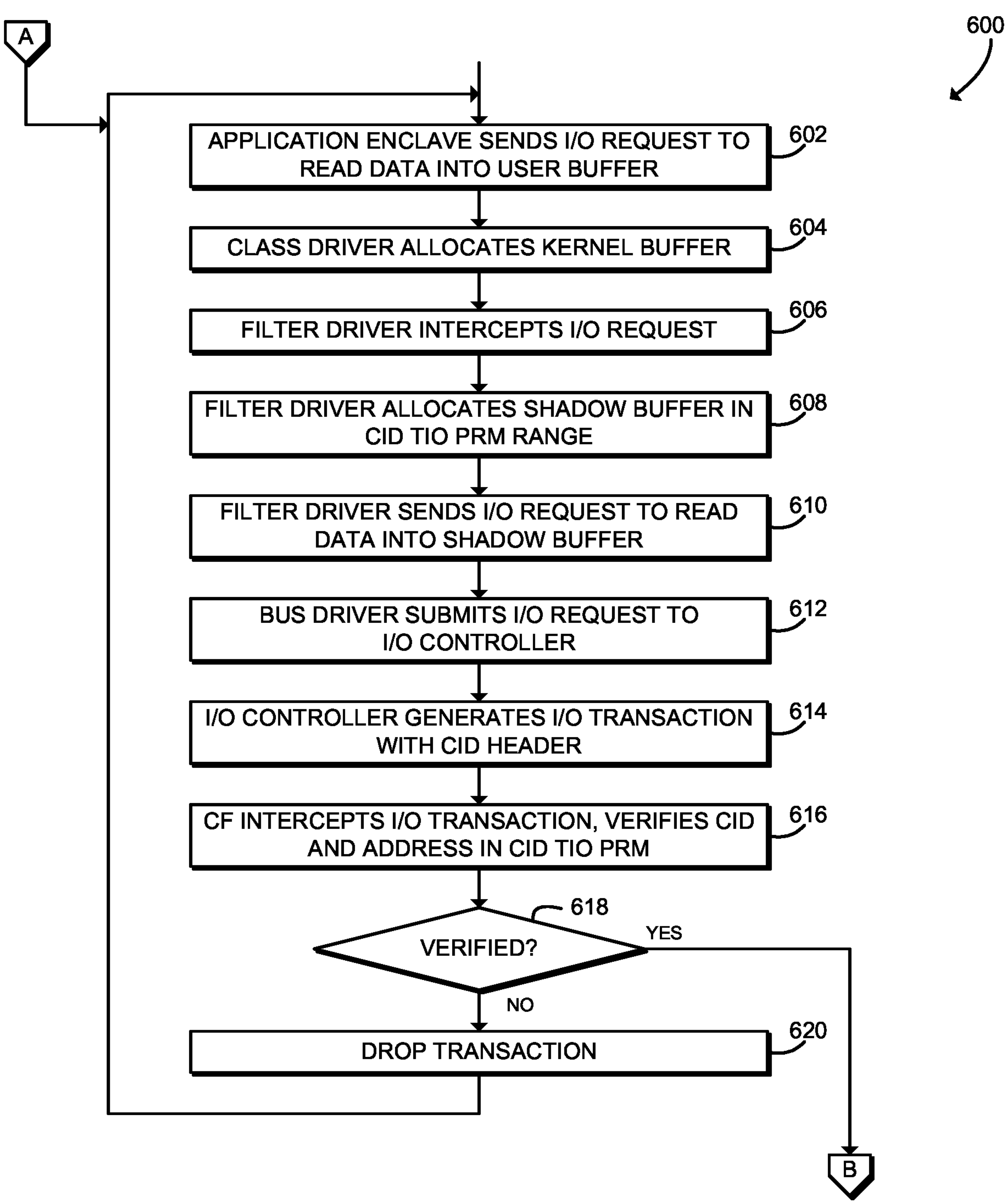
FIGS. 6A and 6B are a simplified flow diagram of at least one embodiment of a method for protecting I/O data that may be executed by the computing device of FIGS. 1-3.
Figure 6B:
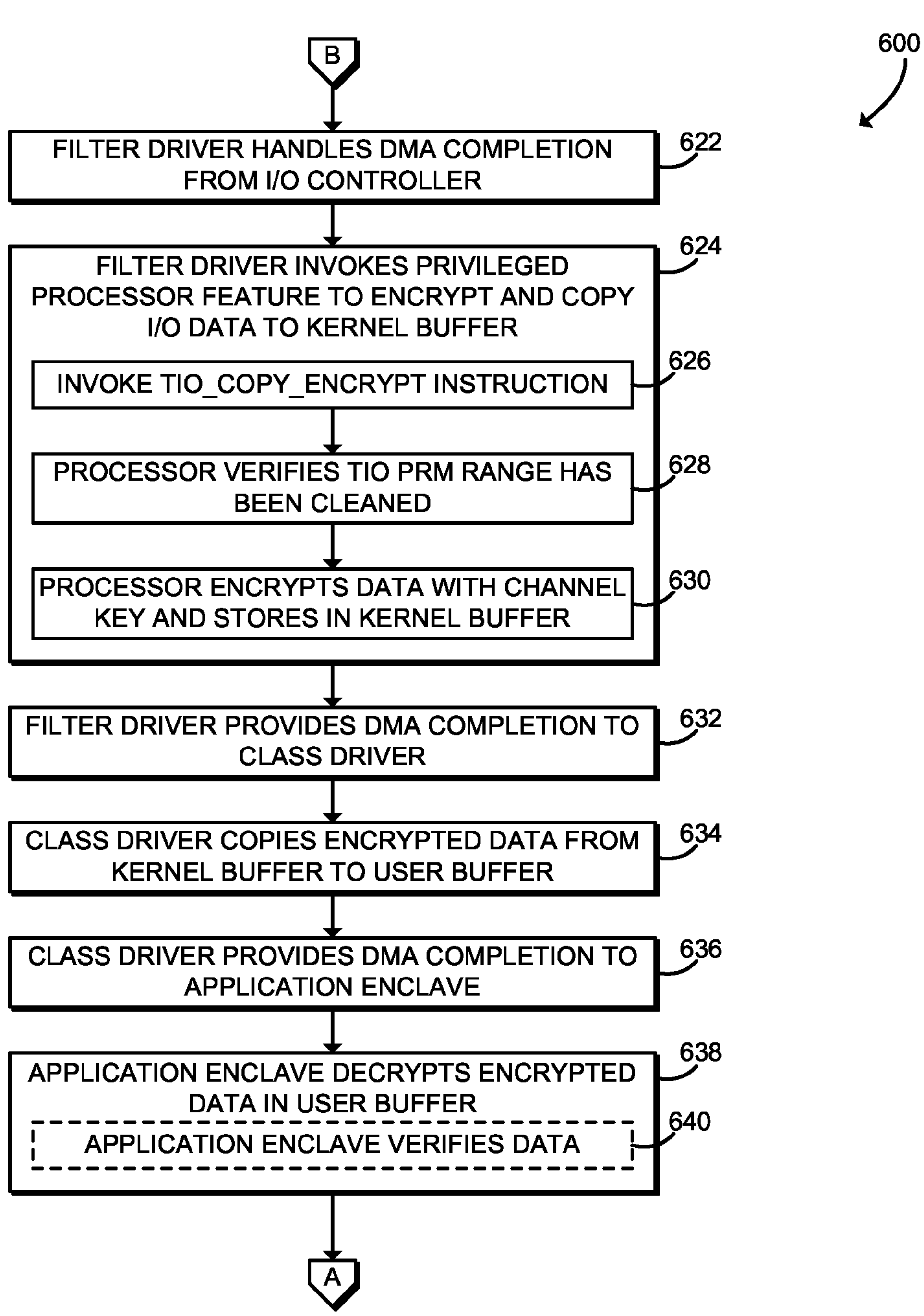

Referring now to FIGS. 6A and 6B, in use, the computing device 100 may execute a method 600 for protected I/O data. It should be appreciated that, in some embodiments, the operations of the method 600 may be performed by one or more components of the environment 200 of the computing device 100 as shown in FIG. 2. The method 600 begins in block 602, in which the application enclave 304 of the computing device 100 sends an I/O request to read data into a user buffer. The I/O request may identify a particular I/O device 140 that has previously been programmed to use a TIO channel as described above in connection with FIGS. 5A and 5B. Thus, the I/O request is associated with a particular channel identifier (CID) that identifies the particular I/O controller 138 and I/O device 140. The user buffer may be embodied as any memory buffer located in an unprivileged memory range (e.g., user memory). The application enclave 304 may use any appropriate technique to send the I/O request, for example by invoking one or more system calls, APIs, or other interfaces to an operating system I/O stack.

The I/O request starts being processed through the operating system I/O stack. In block 604, a class driver 308 allocates a kernel buffer for the I/O request. The kernel buffer may be embodied as any memory buffer located in a privileged memory range (e.g., kernel memory). The class driver 308 may be embodied as a driver appropriate for the I/O device 140 of the I/O request, such as a keyboard, mouse, USB human interface device (HID), webcam, or other device.

In block 606, the filter driver 310 intercepts the I/O request. The filter driver 310 may use any appropriate technique to intercept the I/O request. For example, certain operating systems such as Microsoft® Windows™ may maintain an I/O driver stack that allows a class driver 308 to pass the I/O request down to the filter driver 310. In block 608, the filter driver 310 allocates or otherwise identifies a shadow buffer in the CID TIO PRM range for the I/O request. The shadow buffer may be embodied as any memory buffer included in the CID TIO PRM range. As described above, the CID TIO PRM range is a range of the TIO PRM that has been associated with the CID for a particular TIO channel. Thus, privileged software (i.e., the filter driver 310) manages the allocation of buffers within the TIO PRM, even though the processor 120 may prevent the privileged software from accessing the data within the TIO PRM. As described above in connection with FIGS. 5A and 5B, the CID TIO PRM range is programmed by the CID filter device driver 306 to the CID filter 136 during channel setup.

In block 610, the filter driver 310 sends an I/O request to read data into the shadow buffer. The filter driver 310 may, for example, replace a kernel buffer memory address with the corresponding address of the shadow buffer. The filter driver 310 may send the I/O request, for example, by sending the I/O request further down the system I/O stack. In block 612, the bus driver 312 submits the I/O request to read data into the shadow buffer to the I/O controller 138. The bus driver 312 may be embodied as a driver appropriate for the expansion bus and/or controller type of the I/O controller 138, such as a USB, PCI, or other interface.

In block 614, the I/O controller 138 generates an I/O transaction in response to the I/O request. The I/O transaction includes the CID of the TIO channel, for example included in a TLP prefix of a PCI transaction. The I/O transaction also includes or otherwise identifies the memory address of the shadow buffer in the CID TIO PRM. Of course, the I/O transaction also includes plaintext data received from the I/O device 140.

In block 616, the CID filter (CF) 136 intercepts the I/O transaction and verifies the CID and the address of the I/O transaction. In particular, the CID filter 136 verifies that the CID has been programmed and that the address of the I/O transaction is within the CID TIO PRM range that was previously programmed. For example, the CID filter 136 may look up the CID in a content-addressable memory (CAM) table and then verify the associated address.

In block 618, the CID filter 136 determines whether the I/O transaction was verified. If not, the method 600 advances to block 620, in which the I/O transaction is dropped. In some embodiments, the CID filter 136 may also generate an error signal or other indication that the I/O transaction was dropped. After dropping the I/O transaction, the method 600 loops back to block 602 to process additional I/O transactions. Referring back to block 618, if the I/O transaction was verified, the method 600 branches to block 622, shown in FIG. 6B.

Referring now to FIG. 6B, in block 622 the filter driver 310 handles a DMA completion from the I/O controller 138. The DMA completion is generated when the I/O controller 138 performs a DMA operation to write I/O data from the I/O device 140 into the shadow buffer. The filter driver 310 may use any appropriate technique for handling the DMA completion, for example, handling an interrupt, responding to an event, or otherwise responding to the DMA completion.

In response to the DMA completion, in block 624 the filter driver 310 invokes a privileged processor feature to encrypt and copy the I/O data from the shadow buffer to the kernel buffer. The kernel buffer may be the kernel buffer allocated by the class driver 308 as described above in connection with block 604. The processor 120 encrypts the data using the channel encryption key associated with the TIO channel. The privileged processor feature may be embodied as an instruction, model-specific register (MSR), or other feature of the processor 120. In block 626, the filter driver 310 invokes a TIO_COPY_ENCRYPT instruction of the processor 120. The TIO_COPY_ENCRYPT instruction takes a source address in the TIO PRM range and a destination address in the original kernel memory and copies the DMA data from source to destination after encryption. The filter driver 310 may provide the processor 120 with a COPY_ENC_PARAM_STRUCT data structure that includes parameters for the copy and encrypt operation. For example, the parameters may identify the source address in the TIO PRM range, the size of the data to be encrypted, the CID, the destination address, and storage for integrity data (e.g., an authentication tag). One potential embodiment of the COPY_ENC_PARAM_STRUCT is described below in Table 4. In block 628, in response to invocation of the TIO_COPY_ENCRYPT instruction, the processor 120 verifies that memory in the CID TIO PRM has been cleaned as described above in connection with block 538 of FIG. 5B. If not, the processor 120 may generate an error, for example by setting the RESULT field of the COPY_ENC_PARAM_STRUCT to CENC_PENDING_CLEANUP. If the CID TIO PRM range has been cleaned, in block 630 the processor 120 encrypts I/O data from the CID TIO PRM with the channel encryption key and stores the encrypted data in the kernel buffer. The encryption may be performed by the cryptographic engine 124, for example by processor microcode and/or by one or more cryptographic hardware accelerators.

TABLE 4

COPY_ENC_PARAM_STRUCT

| Field | Size | Description |
|---|---|---|
| CID | 2 | Channel ID |
| SIZE | 2 | Size of data to copy and encrypt |
| VERSION | 4 | Structure version, e.g., must be 1 |
| SOURCE_ADDR | 8 | Effective address in TIO PRM to copy and encrypt from |
| DEST_ADDR | 8 | Effective address of destination buffer in kernel memory |
| RSVD | 8 | Reserved, must be zero |
| AT | 16 | Authentication Tag |
| RESULT | 4 | Result of copy and encrypt operation (e.g., CENC_SUCCESS, CENC_PENDING_CLEANUP) |
| RSVD | 12 | Reserved, must be zero |

In block 632, after copy and encryption has been completed successfully (e.g., if the RESULT field of the COPY_ENC_PARAM_STRUCT is CENC_SUCCESS), then the filter driver 310 provides the DMA completion to the class driver 308. The filter driver 310 may, for example, pass the DMA completion up a system I/O driver stack. In block 634, the class driver 308 copies the encrypted data from the kernel buffer to the user buffer provided by the application enclave 304. In block 636, the class driver 308 provides the DMA completion to the application enclave 304. For example, the class driver 308 may indicate that the I/O request has completed successfully using any appropriate technique.

In block 638, the application enclave 304 decrypts the encrypted data from the user buffer. Because the application enclave 304 is a trusted execution environment, the decrypted, plaintext content of the I/O is not accessible to untrusted software of the computing device such as the operating system (including the class driver 308, the bus driver 312, and/or the filter driver 310). In some embodiments, in block 640 the application enclave 304 may verify the I/O data, for example by verifying an authentication tag associated with the encrypted I/O data. After decrypting the I/O data, the method 600 loops back to block 602, shown in FIG. 6A, to continue processing I/O requests.

Figure 7:
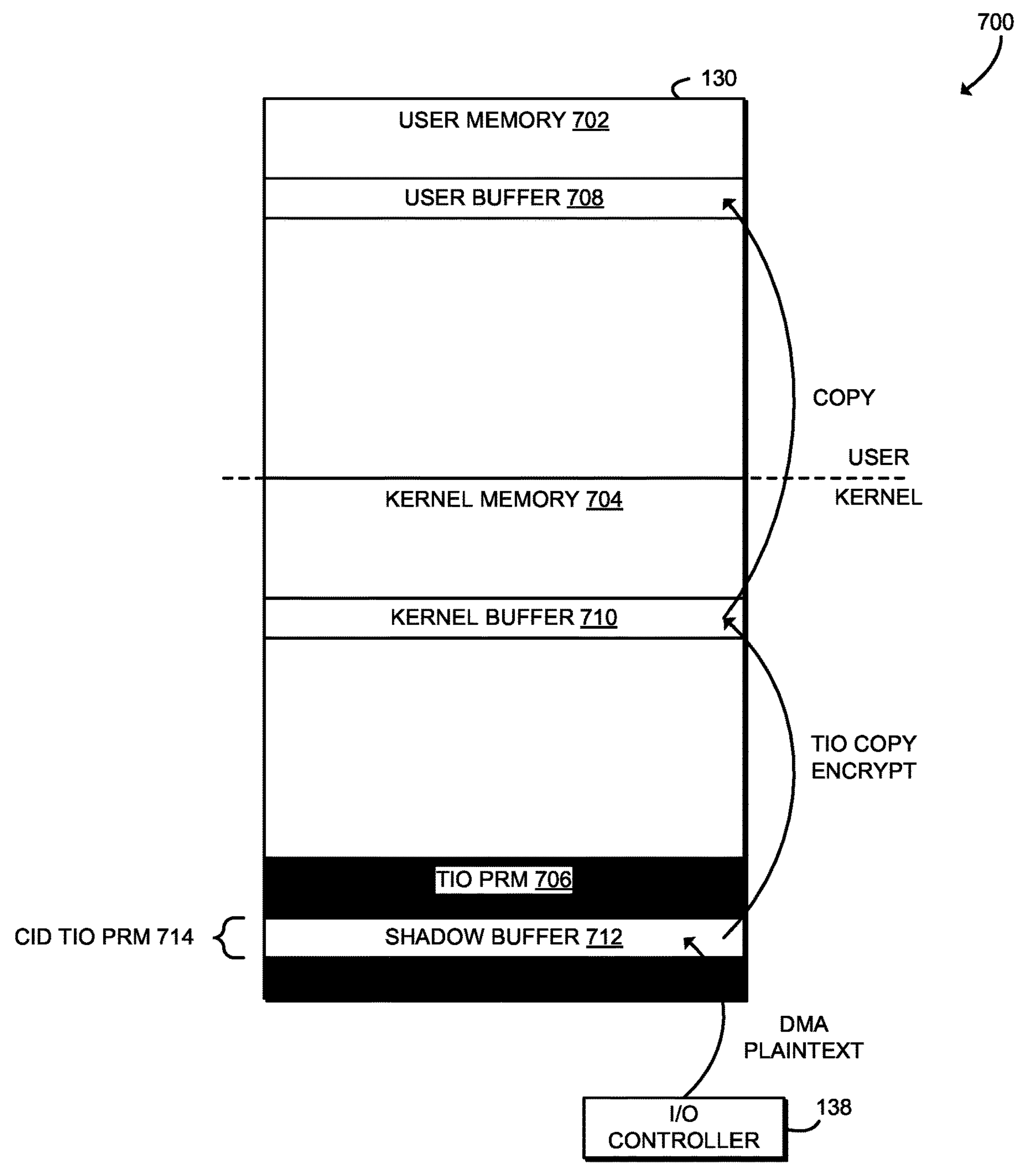
FIG. 7 is a schematic diagram illustrating at least one embodiment of a memory layout that may be established by the computing device of FIGS. 1-3.

Referring now to FIG. 7, diagram 700 illustrates a memory layout that may be established by the computing device 100. As shown, the memory 130 may be divided into user memory 702, kernel memory 704, and a TIO PRM range 706. The user memory is accessible to unprivileged software such as user-mode or ring-3 software, and the kernel memory 704 is accessible to privileged software such as kernel-mode or ring-0 software. The TIO PRM range 706 is not accessible to any software of the computing device 100, and that restriction may be enforced by the processor 120.

In use, as described above in connection with FIGS. 6A and 6B, unprivileged software such as an application enclave 304 allocates a user buffer 708 in the user memory 702. Privileged software such as a class driver 308 allocates a kernel buffer 710 in the kernel memory 704. Similarly, privileged software such as the filter driver 310 allocates a shadow buffer 712 in the TIO PRM 706. In particular, the shadow buffer 712 is included in the CID TIO PRM range associated with a particular TIO channel (e.g., a particular I/O controller 138 and I/O device 140).

As shown, the I/O controller 138 may use a DMA operation to place plaintext I/O data into the shadow buffer 712. As described above, the CID filter 136 may verify that the transaction asserts a valid CID and that the shadow buffer 712 is within the correct CID TIO PRM 714. After the DMA operation, the plain text I/O data in the shadow buffer 712 is not accessible to any software on the system. The filter driver 310 invokes the TIO_COPY_ENCRYPT instruction, and the processor 120 encrypts the plaintext data and stores the encrypted data in the kernel buffer 710. Because the I/O data was encrypted by the processor 120 and only the encrypted data reaches the kernel memory 704, the plaintext I/O data remains inaccessible to any software of the system. Next, the class driver 310 (or other privileged software) copies the encrypted data to the user buffer 708. Once in the user buffer 708, the application enclave 304 may decrypt the encrypted data to recover the plaintext UO data. Thus, the computing device 100 securely transfers the encrypted data through the untrusted system I/O stack before allowing trusted software (e.g., the application enclave 304) to decrypt and access the plaintext I/O data.

It should be appreciated that, in some embodiments, the methods 500 and/or 600 may be embodied as various instructions stored on a computer-readable media, which may be executed by the processor 120, the I/O subsystem 128, and/or other components of the computing device 100 to cause the computing device 100 to perform the respective method 500 and/or 600 respectively. The computer-readable media may be embodied as any type of media capable of being read by the computing device 100 including, but not limited to, the memory 130, the data storage device 132, firmware devices, other memory or data storage devices of the computing device 100, portable media readable by a peripheral device 140 of the computing device 100, and/or other media.

Examples

Illustrative examples of the technologies disclosed herein are provided below. An embodiment of the technologies may include any one or more, and any combination of, the examples described below.

Example 1 includes a computing device for trusted I/O channel protection, the computing device comprising: an I/O controller to generate an I/O transaction, wherein the I/O transaction comprises plaintext I/O data, a channel identifier, and a memory address; a channel identifier filter to (i) intercept the I/O transaction; (ii) determine whether the memory address is included in a first range of a processor reserved memory region in response to interception of the I/O transaction, wherein the first range is associated with the channel identifier; and (iii) allow the I/O transaction to write the plaintext I/O data at the memory address in response to a determination that the memory address is included in the first range of the processor reserved memory region; and a processor to (i) encrypt the plaintext I/O data at the memory address with a channel key to generated encrypted data in response to allowance of the I/O transaction, and (ii) copy the encrypted data to a memory buffer, wherein the memory buffer is outside of the processor reserved memory region.

Example 2 includes the subject matter of Example 1, and further comprising a trusted I/O manager to invoke a privileged processor feature in response to the allowance of the I/O transaction, wherein to encrypt the I/O data comprises to encrypt the I/O data in response to invocation of the privileged processor feature.

Example 3 includes the subject matter of any of Examples 1 and 2, and wherein the privileged processor feature comprises a TIO_COPY_ENCRYPT instruction of the processor.

Example 4 includes the subject matter of any of Examples 1-3, and wherein the channel identifier filter is further to drop the I/O transaction in response to a determination that the memory address is not included in the first range of the processor reserved memory region.

Example 5 includes the subject matter of any of Examples 1-4, and wherein: the channel identifier filter is further to determine whether the I/O transaction includes a channel identifier that has been programmed in response to the interception of the I/O transaction; to allow the I/O transaction to write the plaintext I/O data at the memory address further comprises to allow the I/O transaction to write the plaintext I/O data at the memory address in response to a determination that the I/O transaction does not include a channel identifier; and to determine whether the memory address is included in the first range of the processor reserved memory region further comprises to determine whether the memory address is included in the first range of the processor reserved memory region in response to a determination that the I/O transaction includes a channel identifier.

Example 6 includes the subject matter of any of Examples 1-5, and wherein the processor is further to securely program the channel identifier filter with the channel identifier and the first range of the processor reserved memory region, wherein to generate the I/O transaction comprises to generate the I/O transaction in response to secure programming of the channel identifier filter.

Example 7 includes the subject matter of any of Examples 1-6, and further comprising a firmware environment to configure the processor to reserve the processor reserved memory region, wherein to generate the I/O transaction comprises to generate the I/O transaction in response to configuration of the processor to reserve the processor reserved memory region.

Example 8 includes the subject matter of any of Examples 1-7, and wherein to configure the processor to reserve the processor reserved memory region comprises to set one or more range registers of the processor to identify the processor reserved memory region.

Example 9 includes the subject matter of any of Examples 1-8, and wherein the processor is further to prevent a software component of the computing device from accessing the processor reserved memory region in response to configuration of the processor.

Example 10 includes the subject matter of any of Examples 1-9, and wherein: the processor is further to securely clear the first range of the processor reserved memory region; and to encrypt the I/O data further comprises to: (i) determine, by the processor, whether the first range of the processor reserved memory region has been securely cleared, and (ii) encrypt the I/O data in response to a determination that the first range of the processor reserved memory region has been securely cleared.

Example 11 includes the subject matter of any of Examples 1-10, and further comprising a processor reserved memory manager to invoke a privileged processor feature to securely clear the first range of the processor reserved memory region, wherein to securely clear the first range comprises to securely clear the first range in response to invocation of the privileged processor feature.

Example 12 includes the subject matter of any of Examples 1-11, and wherein the processor is further to indicate an error condition in response to a determination that the processor reserved memory region has not been securely cleared.

Example 13 includes a computing device for secure trusted I/O channel programming, the computing device comprising: a processor; a channel identifier filter; a channel programmer to (i) generate, by an unprivileged software component of the computing device, programming information for the channel identifier filter, wherein the programming information is indicative of a channel identifier and a channel key, and (ii) invoke, by the unprivileged software component, an unprivileged processor instruction with the programming information as a parameter; and a wrapping engine to generate, by the processor, wrapped programming information based on the programming information in response to invocation of the unprivileged processor instruction, wherein the wrapped programming information includes an encrypted channel key and is indicative of a processor reserved memory region that is associated with the channel identifier.

Example 14 includes the subject matter of Example 13, and wherein the unprivileged processor instruction comprises an EBIND instruction.

Example 15 includes the subject matter of any of Examples 13 and 14, and wherein to generate the wrapped programming information comprises to encrypt the channel key with a key-wrapping key to generate the encrypted channel key, wherein the key-wrapping key is private to the processor.

Example 16 includes the subject matter of any of Examples 13-15, and further comprising a firmware environment to assign a trusted I/O processor reserved memory region, wherein the trusted I/O processor reserved memory region includes the processor reserved memory region associated with the channel identifier.

Example 17 includes the subject matter of any of Examples 13-16, and wherein the firmware environment is further to: store a trusted I/O processor reserved memory region setting in a firmware variable in response to assignment of the trusted I/O processor reserved memory region; and integrity-protect the firmware variable with a trusted platform module of the computing device.

Example 18 includes the subject matter of any of Examples 13-17, and wherein the processor is further to prevent the unprivileged software component from accessing the processor reserved memory region associated with the channel identifier.

Example 19 includes the subject matter of any of Examples 13-18, and wherein the processor further comprises secure enclave support to establish a secure enclave, and wherein the secure enclave includes the unprivileged software component.

Example 20 includes the subject matter of any of Examples 13-19, and wherein: the channel programmer is further to (i) provide, by the unprivileged software component, the wrapped programming information to a privileged software component of the computing device, and (ii) invoke, by the privileged software component, a first privileged processor feature with the wrapped programming information as a parameter; and the computing device further comprises an unwrapping engine to program, by the processor, the channel identifier filter with the channel identifier and a memory range of the processor reserved memory region in response to invocation of the first privileged processor feature.

Example 21 includes the subject matter of any of Examples 13-20, and wherein the first privileged processor feature comprises a TIO_UNWRAP instruction of the processor.

Example 22 includes the subject matter of any of Examples 13-21, and further comprising: a processor reserved memory manager to invoke, by the privileged software component, a second privileged processor feature with the memory range of the processor reserved memory region as a parameter; and a cleaning engine to securely clear, by the processor, the memory range of the processor reserved memory region in response to invocation of the second privileged processor feature.

Example 23 includes the subject matter of any of Examples 13-22, and wherein the second privileged processor feature comprises a TIO_PRM_CLEANUP instruction of the processor.

Example 24 includes the subject matter of any of Examples 13-23, and wherein: the channel programmer is further to verify, by the privileged software component, the wrapped programming information; and to invoke the first privileged processor feature comprises to invoke the first privileged processor feature in response to verification of the wrapped programming information.

Example 25 includes the subject matter of any of Examples 13-24, and wherein the channel programmer is further to read, by the privileged software component, a cryptographic response from the processor in response to invocation of the first privileged processor feature.

Example 26 includes the subject matter of any of Examples 13-25, and wherein the processor is further to prevent the privileged software component from accessing the processor reserved memory region associated with the channel identifier.

Example 27 includes the subject matter of any of Examples 13-26, and wherein the privileged software component comprises a kernel mode driver of the computing device.

Example 28 includes the subject matter of any of Examples 13-27, and wherein: the channel identifier filter is to verify an I/O transaction in response to programming of the channel identifier filter, wherein the I/O transaction comprises the channel identifier and a memory address, and wherein to verify the I/O transaction comprises to verify that the memory address is included in the processor reserved memory region that is associated with the channel identifier; the computing device further comprises a trusted I/O manager to invoke, by the privileged software component, a third privileged processor feature in response to verification of the I/O transaction; and the computing device further comprises a copy/encrypt engine to (i) encrypt, by the processor, I/O data at the memory address with the channel key to generated encrypted data in response to invocation of the third privileged processor feature, and (ii) copy, by the processor, the encrypted data to a privileged memory buffer, wherein the privileged memory buffer is outside of the processor reserved memory region.

Example 29 includes the subject matter of any of Examples 13-28, and wherein the third privileged processor feature comprises a TIO_COPY_ENCRYPT instruction of the processor.

Example 30 includes the subject matter of any of Examples 13-29, and wherein the privileged software component comprises a kernel mode filter driver of the computing device.

Example 31 includes the subject matter of any of Examples 13-30, and wherein: the trusted I/O manager is further to: (i) intercept, by the filter driver, an I/O request, wherein the I/O request is indicative of the privileged memory buffer; (ii) allocate, by the filter driver, a shadow memory buffer located at the memory address in the processor reserved memory region that is associated with the channel identifier; and (iii) generate, by the filter driver, a replacement I/O request indicative of the memory address in response to allocating the shadow memory buffer; the computing device further comprises an I/O controller to generate the I/O transaction in response to generation of the replacement I/O request; and to verify the I/O transaction comprises to verify the I/O transaction in response to generation of the I/O transaction.

Example 32 includes the subject matter of any of Examples 13-31, and further comprising: a processor reserved memory manager to invoke, by the privileged software component, a second privileged processor feature to securely clear the processor reserved memory region that is associated with the channel identifier; wherein the copy/encrypt engine is further to determine, by the processor, whether the processor reserved memory region has been securely cleared in response to invocation of the privileged processor feature; and wherein to encrypt the I/O data comprises to encrypt the I/O data in response to a determination that the processor reserved memory region has been securely cleared.

Example 33 includes the subject matter of any of Examples 13-32, and wherein the copy/encrypt engine is further to indicate, by the processor, an error condition in response to a determination that the processor reserved memory region has not been securely cleared.

Example 34 includes the subject matter of any of Examples 13-33, and wherein the trusted I/O manager is further to copy, by the privileged software component, the encrypted data from the privileged memory buffer to an unprivileged memory buffer.

Example 35 includes the subject matter of any of Examples 13-34, and wherein the trusted I/O manager is further to decrypt, by the unprivileged software component of the computing device, the encrypted data in the unprivileged memory buffer in response to copying of the encrypted data.

Example 36 includes a method for trusted I/O channel protection, the method comprising: generating, by an I/O controller of a computing device, an I/O transaction, wherein the I/O transaction comprises plaintext I/O data, a channel identifier, and a memory address; intercepting, by a channel identifier filter of the computing device, the I/O transaction; determining, by the channel identifier filter, whether the memory address is included in a first range of a processor reserved memory region in response to intercepting the I/O transaction, wherein the first range is associated with the channel identifier; allowing, by the channel identifier filter, the I/O transaction to write the plaintext I/O data at the memory address in response to determining that the memory address is included in the first range of the processor reserved memory region; encrypting, by a processor of the computing device, the plaintext I/O data at the memory address with a channel key to generated encrypted data in response to allowing the I/O transaction; and copying, by the processor, the encrypted data to a memory buffer, wherein the memory buffer is outside of the processor reserved memory region.

Example 37 includes the subject matter of Example 36, and further comprising invoking, by the computing device, a privileged processor feature in response to allowing the I/O transaction, wherein encrypting the I/O data comprises encrypting the I/O data in response to invoking the privileged processor feature.

Example 38 includes the subject matter of any of Examples 36 and 37, and wherein invoking the privileged processor feature comprises invoking a TIO_COPY_ENCRYPT instruction of the processor.

Example 39 includes the subject matter of any of Examples 36-38, and further comprising dropping, by the channel identifier filter, the I/O transaction in response to determining that the memory address is not included in the first range of the processor reserved memory region.

Example 40 includes the subject matter of any of Examples 36-39, and further comprising: determining, by the channel identifier filter, whether the I/O transaction includes a channel identifier that has been programmed in response to intercepting the I/O transaction; wherein allowing the I/O transaction to write the plaintext I/O data at the memory address further comprises allowing the I/O transaction to write the plaintext I/O data at the memory address in response to determining that the I/O transaction does not include a channel identifier; and wherein determining whether the memory address is included in the first range of the processor reserved memory region further comprises determining whether the memory address is included in the first range of the processor reserved memory region in response to determining that the I/O transaction includes a channel identifier.

Example 41 includes the subject matter of any of Examples 36-40, and further comprising securely programming, by the computing device, the channel identifier filter with the channel identifier and the first range of the processor reserved memory region, wherein generating the I/O transaction comprises generating the I/O transaction in response to securely programming the channel identifier filter.

Example 42 includes the subject matter of any of Examples 36-41, and further comprising: configuring, by the computing device, the processor to reserve the processor reserved memory region, wherein generating the I/O transaction comprises generating the I/O transaction in response to configuring the processor to reserve the processor reserved memory region.

Example 43 includes the subject matter of any of Examples 36-42, and wherein configuring the processor to reserve the processor reserved memory region comprises setting one or more range registers of the processor to identify the processor reserved memory region.

Example 44 includes the subject matter of any of Examples 36-43, and further comprising preventing, by the processor of the computing device, a software component of the computing device from accessing the processor reserved memory region in response to configuring the processor.

Example 45 includes the subject matter of any of Examples 36-44, and further comprising: securely clearing, by the processor of the computing device, the first range of the processor reserved memory region; wherein encrypting the I/O data further comprises: (i) determining, by the processor, whether the first range of the processor reserved memory region has been securely cleared, and (ii) encrypting the I/O data in response to determining that the first range of the processor reserved memory region has been securely cleared.

Example 46 includes the subject matter of any of Examples 36-45, and further comprising invoking, by the computing device, a privileged processor feature to securely clear the first range of the processor reserved memory region, wherein securely clearing the first range comprises securely clearing the first range in response to invoking the privileged processor feature.

Example 47 includes the subject matter of any of Examples 36-46, and further comprising indicating, by the processor, an error condition in response to determining that the first range of the processor reserved memory region has not been securely cleared.

Example 48 includes a method for secure trusted I/O channel programming, the method comprising: generating, by an unprivileged software component of a computing device, programming information for a channel identifier filter of the computing device, wherein the programming information is indicative of a channel identifier and a channel key; invoking, by the unprivileged software component, an unprivileged processor instruction with the programming information as a parameter; and generating, by a processor of the computing device, wrapped programming information based on the programming information in response to invoking the unprivileged processor instruction, wherein the wrapped programming information includes an encrypted channel key and is indicative of a processor reserved memory region that is associated with the channel identifier.

Example 49 includes the subject matter of Example 48, and wherein invoking the unprivileged processor instruction comprises invoking an EBIND instruction.

Example 50 includes the subject matter of any of Examples 48 and 49, and wherein generating the wrapped programming information comprises encrypting the channel key with a key-wrapping key to generate the encrypted channel key, wherein the key-wrapping key is private to the processor.

Example 51 includes the subject matter of any of Examples 48-50, and further comprising assigning, by a firmware environment of the computing device, a trusted I/O processor reserved memory region, wherein the trusted I/O processor reserved memory region includes the processor reserved memory region associated with the channel identifier.

Example 52 includes the subject matter of any of Examples 48-51, and further comprising: storing, by the firmware environment, a trusted I/O processor reserved memory region setting in a firmware variable in response to assigning the trusted I/O processor reserved memory region; and integrity-protecting, by the firmware environment, the firmware variable using a trusted platform module of the computing device.

Example 53 includes the subject matter of any of Examples 48-52, and further comprising preventing, by the computing device, the unprivileged software component from accessing the processor reserved memory region associated with the channel identifier.

Example 54 includes the subject matter of any of Examples 48-53, and further comprising establishing, by the processor, a secure enclave with secure enclave support of the processor, wherein the secure enclave includes the unprivileged software component.

Example 55 includes the subject matter of any of Examples 48-54, and further comprising: providing, by the unprivileged software component, the wrapped programming information to a privileged software component of the computing device; invoking, by the privileged software component, a first privileged processor feature with the wrapped programming information as a parameter; and programming, by the processor, the channel identifier filter with the channel identifier and a memory range of the processor reserved memory region in response to invoking the first privileged processor feature.

Example 56 includes the subject matter of any of Examples 48-55, and wherein invoking the first privileged processor feature comprises invoking a TIO_UNWRAP instruction of the processor.

Example 57 includes the subject matter of any of Examples 48-56, and further comprising: invoking, by the privileged software component, a second privileged processor feature with the memory range of the processor reserved memory region as a parameter; and securely clearing, by the processor, the memory range of the processor reserved memory region in response to invoking the second privileged processor feature.

Example 58 includes the subject matter of any of Examples 48-57, and wherein invoking the second privileged processor feature comprises invoking a TIO_PRM_CLEANUP instruction of the processor.

Example 59 includes the subject matter of any of Examples 48-58, and further comprising: verifying, by the privileged software component, the wrapped programming information; wherein invoking the first privileged processor feature comprises invoking the first privileged processor feature in response to verifying the wrapped programming information.

Example 60 includes the subject matter of any of Examples 48-59, and further comprising reading, by the privileged software component, a cryptographic response from the processor in response to invoking the first privileged processor feature.

Example 61 includes the subject matter of any of Examples 48-60, and further comprising preventing, by the computing device, the privileged software component from accessing the processor reserved memory region associated with the channel identifier.

Example 62 includes the subject matter of any of Examples 48-61, and wherein the privileged software component comprises a kernel mode driver of the computing device.

Example 63 includes the subject matter of any of Examples 48-62, and further comprising: verifying, by the channel identifier filter, an I/O transaction in response to programming the channel identifier filter, wherein the I/O transaction comprises the channel identifier and a memory address, and wherein verifying the I/O transaction comprises verifying that the memory address is included in the processor reserved memory region that is associated with the channel identifier; invoking, by the privileged software component, a third privileged processor feature in response to verifying the I/O transaction; encrypting, by the processor, I/O data at the memory address with the channel key to generated encrypted data in response to invoking the third privileged processor feature; and copying, by the processor, the encrypted data to a privileged memory buffer, wherein the privileged memory buffer is outside of the processor reserved memory region.

Example 64 includes the subject matter of any of Examples 48-63, and wherein invoking the third privileged processor feature comprises invoking a TIO_COPY_ENCRYPT instruction of the processor.

Example 65 includes the subject matter of any of Examples 48-64, and wherein the privileged software component comprises a kernel mode filter driver of the computing device.

Example 66 includes the subject matter of any of Examples 48-65, and further comprising: intercepting, by the filter driver, an I/O request, wherein the I/O request is indicative of the privileged memory buffer; allocating, by the filter driver, a shadow memory buffer located at the memory address in the processor reserved memory region that is associated with the channel identifier; generating, by the filter driver, a replacement I/O request indicative of the memory address in response to allocating the shadow memory buffer; and generating, by an I/O controller of the computing device, the I/O transaction in response to generating the replacement I/O request; wherein verifying the I/O transaction comprises verifying the I/O transaction in response to generating the I/O transaction.

Example 67 includes the subject matter of any of Examples 48-66, and further comprising: invoking, by the privileged software component, a second privileged processor feature to securely clear the processor reserved memory region that is associated with the channel identifier; and determining, by the processor, whether the processor reserved memory region has been securely cleared in response to invoking the third privileged processor feature; wherein encrypting the I/O data comprises encrypting the I/O data in response to determining that the processor reserved memory region has been securely cleared.

Example 68 includes the subject matter of any of Examples 48-67, and further comprising indicating, by the processor, an error condition in response to determining that the processor reserved memory region has not been securely cleared.

Example 69 includes the subject matter of any of Examples 48-68, and further comprising copying, by the privileged software component, the encrypted data from the privileged memory buffer to an unprivileged memory buffer.

Example 70 includes the subject matter of any of Examples 48-69, and further comprising decrypting, by the unprivileged software component of the computing device, the encrypted data in the unprivileged memory buffer in response to copying the encrypted data.

Example 71 includes a computing device comprising: a processor; and a memory having stored therein a plurality of instructions that when executed by the processor cause the computing device to perform the method of any of Examples 36-70.

Example 72 includes one or more machine readable storage media comprising a plurality of instructions stored thereon that in response to being executed result in a computing device performing the method of any of Examples 36-70.

Example 73 includes a computing device comprising means for performing the method of any of Examples 36-70.

Example 74 includes a computing device for trusted I/O channel protection, the computing device comprising: means for generating, by an I/O controller of the computing device, an I/O transaction, wherein the I/O transaction comprises plaintext I/O data, a channel identifier, and a memory address; means for intercepting, by a channel identifier filter of the computing device, the I/O transaction; means for determining, by the channel identifier filter, whether the memory address is included in a first range of a processor reserved memory region in response to intercepting the I/O transaction, wherein the first range is associated with the channel identifier; means for allowing, by the channel identifier filter, the I/O transaction to write the plaintext I/O data at the memory address in response to determining that the memory address is included in the first range of the processor reserved memory region; means for encrypting, by a processor of the computing device, the plaintext I/O data at the memory address with a channel key to generated encrypted data in response to allowing the I/O transaction; and means for copying, by the processor, the encrypted data to a memory buffer, wherein the memory buffer is outside of the processor reserved memory region.

Example 75 includes the subject matter of Example 74, and further comprising means for invoking a privileged processor feature in response to allowing the I/O transaction, wherein encrypting the I/O data comprises encrypting the I/O data in response to invoking the privileged processor feature.

Example 76 includes the subject matter of any of Examples 74 and 75, and wherein the means for invoking the privileged processor feature comprises means for invoking a TIO_COPY_ENCRYPT instruction of the processor.

Example 77 includes the subject matter of any of Examples 74-76, and further comprising means for dropping, by the channel identifier filter, the I/O transaction in response to determining that the memory address is not included in the first range of the processor reserved memory region.

Example 78 includes the subject matter of any of Examples 74-77, and further comprising: means for determining, by the channel identifier filter, whether the I/O transaction includes a channel identifier that has been programmed in response to intercepting the I/O transaction; wherein the means for allowing the I/O transaction to write the plaintext I/O data at the memory address further comprises means for allowing the I/O transaction to write the plaintext I/O data at the memory address in response to determining that the I/O transaction does not include a channel identifier; and wherein the means for determining whether the memory address is included in the first range of the processor reserved memory region further comprises means for determining whether the memory address is included in the first range of the processor reserved memory region in response to determining that the I/O transaction includes a channel identifier.

Example 79 includes the subject matter of any of Examples 74-78, and further comprising means for securely programming the channel identifier filter with the channel identifier and the first range of the processor reserved memory region, wherein generating the I/O transaction comprises generating the I/O transaction in response to securely programming the channel identifier filter.

Example 80 includes the subject matter of any of Examples 74-79, and further comprising means for configuring the processor to reserve the processor reserved memory region, wherein the means for generating the I/O transaction comprises means for generating the I/O transaction in response to configuring the processor to reserve the processor reserved memory region.

Example 81 includes the subject matter of any of Examples 74-80, and wherein the means for configuring the processor to reserve the processor reserved memory region comprises means for setting one or more range registers of the processor to identify the processor reserved memory region.

Example 82 includes the subject matter of any of Examples 74-81 and further comprising means for preventing, by the processor of the computing device, a software component of the computing device from accessing the processor reserved memory region in response to configuring the processor.

Example 83 includes the subject matter of any of Examples 74-82, and further comprising: means for securely clearing, by the processor of the computing device, the first range of the processor reserved memory region; wherein the means for encrypting the I/O data further comprises: (i) means for determining, by the processor, whether the first range of the processor reserved memory region has been securely cleared, and (ii) means for encrypting the I/O data in response to determining that the first range of the processor reserved memory region has been securely cleared.

Example 84 includes the subject matter of any of Examples 74-83, and further comprising means for invoking a privileged processor feature to securely clear the first range of the processor reserved memory region, wherein the means for securely clearing the first range comprises means for securely clearing the first range in response to invoking the privileged processor feature.

Example 85 includes the subject matter of any of Examples 74-84, and further comprising means for indicating, by the processor, an error condition in response to determining that the first range of the processor reserved memory region has not been securely cleared.

Example 86 includes a computing device for secure trusted I/O channel programming, the computing device comprising: means for generating, by an unprivileged software component of the computing device, programming information for a channel identifier filter of the computing device, wherein the programming information is indicative of a channel identifier and a channel key; means for invoking, by the unprivileged software component, an unprivileged processor instruction with the programming information as a parameter; and means for generating, by a processor of the computing device, wrapped programming information based on the programming information in response to invoking the unprivileged processor instruction, wherein the wrapped programming information includes an encrypted channel key and is indicative of a processor reserved memory region that is associated with the channel identifier.

Example 87 includes the subject matter of Example 86, and wherein the means for invoking the unprivileged processor instruction comprises means for invoking an EBIND instruction.

Example 88 includes the subject matter of any of Examples 86 and 87, and wherein the means for generating the wrapped programming information comprises means for encrypting the channel key with a key-wrapping key to generate the encrypted channel key, wherein the key-wrapping key is private to the processor.

Example 89 includes the subject matter of any of Examples 86-88, and further comprising means for assigning, by a firmware environment of the computing device, a trusted I/O processor reserved memory region, wherein the trusted I/O processor reserved memory region includes the processor reserved memory region associated with the channel identifier.

Example 90 includes the subject matter of any of Examples 86-89, and further comprising: means for storing, by the firmware environment, a trusted I/O processor reserved memory region setting in a firmware variable in response to assigning the trusted I/O processor reserved memory region; and means for integrity-protecting, by the firmware environment, the firmware variable using a trusted platform module of the computing device.

Example 91 includes the subject matter of any of Examples 86-90, and further comprising means for preventing the unprivileged software component from accessing the processor reserved memory region associated with the channel identifier.

Example 92 includes the subject matter of any of Examples 86-91, and further comprising means for establishing, by the processor, a secure enclave with secure enclave support of the processor, wherein the secure enclave includes the unprivileged software component.

Example 93 includes the subject matter of any of Examples 86-92, and further comprising: means for providing, by the unprivileged software component, the wrapped programming information to a privileged software component of the computing device; means for invoking, by the privileged software component, a first privileged processor feature with the wrapped programming information as a parameter; and means for programming, by the processor, the channel identifier filter with the channel identifier and a memory range of the processor reserved memory region in response to invoking the first privileged processor feature.

Example 94 includes the subject matter of any of Examples 86-93, and wherein the means for invoking the first privileged processor feature comprises means for invoking a TIO_UNWRAP instruction of the processor.

Example 95 includes the subject matter of any of Examples 86-94, and further comprising: means for invoking, by the privileged software component, a second privileged processor feature with the memory range of the processor reserved memory region as a parameter; and means for securely clearing, by the processor, the memory range of the processor reserved memory region in response to invoking the second privileged processor feature.

Example 96 includes the subject matter of any of Examples 86-95, and wherein the means for invoking the second privileged processor feature comprises means for invoking a TIO_PRM_CLEANUP instruction of the processor.

Example 97 includes the subject matter of any of Examples 86-96, and further comprising: means for verifying, by the privileged software component, the wrapped programming information; wherein the means for invoking the first privileged processor feature comprises means for invoking the first privileged processor feature in response to verifying the wrapped programming information.

Example 98 includes the subject matter of any of Examples 86-97, and further comprising means for reading, by the privileged software component, a cryptographic response from the processor in response to invoking the first privileged processor feature.

Example 99 includes the subject matter of any of Examples 86-98, and further comprising means for preventing the privileged software component from accessing the processor reserved memory region associated with the channel identifier.

Example 100 includes the subject matter of any of Examples 86-99, and wherein the privileged software component comprises a kernel mode driver of the computing device.

Example 101 includes the subject matter of any of Examples 86-100, and further comprising: means for verifying, by the channel identifier filter, an I/O transaction in response to programming the channel identifier filter, wherein the I/O transaction comprises the channel identifier and a memory address, and wherein verifying the I/O transaction comprises verifying that the memory address is included in the processor reserved memory region that is associated with the channel identifier; means for invoking, by the privileged software component, a third privileged processor feature in response to verifying the I/O transaction; means for encrypting, by the processor, I/O data at the memory address with the channel key to generated encrypted data in response to invoking the third privileged processor feature; and means for copying, by the processor, the encrypted data to a privileged memory buffer, wherein the privileged memory buffer is outside of the processor reserved memory region.

Example 102 includes the subject matter of any of Examples 86-101, and wherein the means for invoking the third privileged processor feature comprises means for invoking a TIO_COPY_ENCRYPT instruction of the processor.

Example 103 includes the subject matter of any of Examples 86-102, and wherein the privileged software component comprises a kernel mode filter driver of the computing device.

Example 104 includes the subject matter of any of Examples 86-103, and further comprising: means for intercepting, by the filter driver, an I/O request, wherein the I/O request is indicative of the privileged memory buffer; means for allocating, by the filter driver, a shadow memory buffer located at the memory address in the processor reserved memory region that is associated with the channel identifier; means for generating, by the filter driver, a replacement I/O request indicative of the memory address in response to allocating the shadow memory buffer; and means for generating, by an I/O controller of the computing device, the I/O transaction in response to generating the replacement I/O request; wherein the means for verifying the I/O transaction comprises means for verifying the I/O transaction in response to generating the I/O transaction.

Example 105 includes the subject matter of any of Examples 86-104, and further comprising: means for invoking, by the privileged software component, a second privileged processor feature to securely clear the processor reserved memory region that is associated with the channel identifier; and means for determining, by the processor, whether the processor reserved memory region has been securely cleared in response to invoking the third privileged processor feature; wherein the means for encrypting the I/O data comprises means for encrypting the I/O data in response to determining that the processor reserved memory region has been securely cleared.

Example 106 includes the subject matter of any of Examples 86-105, and further comprising means for indicating, by the processor, an error condition in response to determining that the processor reserved memory region has not been securely cleared.

Example 107 includes the subject matter of any of Examples 86-106, and further comprising means for copying, by the privileged software component, the encrypted data from the privileged memory buffer to an unprivileged memory buffer.

Example 108 includes the subject matter of any of Examples 86-107, and further comprising means for decrypting, by the unprivileged software component of the computing device, the encrypted data in the unprivileged memory buffer in response to copying the encrypted data.

The invention claimed is:

1. An apparatus comprising:

a memory controller; and processor circuitry coupled to the memory controller, the processor circuitry to:

receive an unprivileged processor instruction with programming information, which is to have been generated by one or more unprivileged software components of a trusted execution environment, as a parameter, the programming information including a direct memory access (DMA) channel identifier and a channel key;

generate wrapped programming information based on the programming information in response to the unprivileged processor instruction, wherein the channel key is to be encrypted using a key-wrapping key to generate an encrypted channel key, wherein the wrapped programming information includes the encrypted channel key and the DMA channel identifier, wherein a trusted input/output (I/O) processor reserved memory region has a plurality of ranges including a first range characterized by a first base and a first size mapped to the DMA channel identifier and a second range characterized by a second base and a second size mapped to another DMA channel identifier, and wherein the processor reserved memory region is inaccessible to the one or more unprivileged software components; and perform operations corresponding to a second instruction that is to indicate the wrapped programming information, including to decrypt the encrypted channel key to generate the channel key, program the channel key to a cryptographic unit of a processor core having the processor circuitry, and program the DMA channel identifier to a channel filter.

2. The apparatus of claim 1, wherein the unprivileged processor instruction is invoked using an unprivileged software component of the one or more unprivileged software components, and wherein the key-wrapping key is private to the processor circuitry.

3. The apparatus of claim 1, wherein the processor circuitry is further to assign, via a firmware environment, the trusted I/O processor reserved memory region.

4. The apparatus of claim 1, wherein the second instruction is a privileged instruction, and wherein the operations corresponding to the second instruction include to program the first range to the channel filter.

5. The apparatus of claim 3, wherein the processor circuitry is further to:

store a trusted I/O processor reserved memory region setting in a firmware variable in response to assignment of the trusted I/O processor reserved memory region; and integrity-protect the firmware variable with a trusted platform module of a computing device.

6. The apparatus of claim 4, wherein the processor circuitry is further to:

invoke a third privileged processor instruction with the first range as a parameter; and securely clear the first range in response to invocation of the third privileged processor instruction.

7. The apparatus of claim 4, wherein the processor circuitry is further to:

verify the wrapped programming information wherein to invoke the second privileged processor instruction comprises to invoke the second privileged processor instruction in response to verification of the wrapped programming information.

8. The apparatus of claim 4, wherein the processor circuitry is further to:

read a cryptographic response from the processor in response to invocation of the first second privileged processor instruction; and prevent a privileged software component from accessing the first range associated with the DMA channel identifier, and wherein the privileged software component comprises a kernel mode driver.

9. A method comprising:

receiving an unprivileged processor instruction with programming information, which is to have been generated by one or more unprivileged software components of a trusted execution environment, as a parameter, the programming information including a direct memory access (DMA) channel identifier and a channel key;

generating wrapped programming information based on the programming information in response to the unprivileged processor instruction, wherein the channel key is to be encrypted using a key-wrapping key to generate an encrypted channel key, wherein the wrapped programming information includes the encrypted channel key and the DMA channel identifier, wherein a trusted input/output (I/O) processor reserved memory region has a plurality of ranges including a first range characterized by a first base and a first size mapped to the DMA channel identifier and a second range characterized by a second base and a second size mapped to another DMA channel identifier, and wherein the processor reserved memory region is inaccessible to the one or more unprivileged software components; and performing operations corresponding to a second instruction indicating the wrapped programming information, including decrypting the encrypted channel key to generate the channel key, programing the channel key to a cryptographic unit of a processor core that received the unprivileged processor instruction, and programing the DMA channel identifier into a channel filter.

10. The method of claim 9, and wherein the unprivileged processor instruction is invoked using an unprivileged software component of the one or more unprivileged software components, and wherein key-wrapping key is private to a processor that receives the unprivileged processor instruction.

11. The method of claim 9, further comprising assigning, via a firmware environment, the trusted I/O processor reserved memory region, wherein processor circuitry is further to establish a secure enclave.

12. The method of claim 9, wherein the second instruction is a privileged instruction, and wherein the operations corresponding to the second instruction include to program the first range to the channel filter.

13. The method of claim 11, further comprising:

storing a trusted I/O processor reserved memory region setting in a firmware variable in response to assignment of the trusted I/O processor reserved memory region; and integrity-protecting the firmware variable with a trusted platform module of a computing device.

14. The method of claim 12, further comprising:

invoking a third privileged processor instruction with the first range as a parameter; and securely clearing the first range in response to invocation of the third privileged processor instruction.

15. The method of claim 12, further comprising:

verifying the wrapped programming information, wherein to invoke the second privileged processor instruction comprises to invoke the second privileged processor instruction in response to verification of the wrapped programming information.

16. The method of claim 12, further comprising:

reading a cryptographic response from the processor in response to invocation of the first second privileged processor instruction; and preventing a privileged software component from accessing the first range associated with the DMA channel identifier, and wherein the privileged software component comprises a kernel mode driver.

17. At least one computer-readable medium having stored thereon instructions which, when executed, cause a computing device to perform operations including to:

generate programming information by one or more unprivileged software components of a trusted execution environment;

invoke an unprivileged processor instruction with the programming information as a parameter, the programming information including a direct memory access (DMA) channel identifier and a channel key;

generate wrapped programming information based on the programming information in response to the unprivileged processor instruction, wherein the channel key is to be encrypted using a key-wrapping key to generate an encrypted channel key, wherein the wrapped programming information includes the encrypted channel key and the DMA channel identifier, wherein a trusted input/output (I/O) processor reserved memory region has a plurality of ranges including a first range characterized by a first base and a first size mapped to the DMA channel identifier and a second range characterized by a second base and a second size mapped to another DMA channel identifier, and wherein the processor reserved memory region is inaccessible to the one or more unprivileged software components; and perform operations corresponding to a second instruction that is to indicate the wrapped programming information, including to decrypt the encrypted channel key to generate the channel key, program the channel key to a cryptographic unit of a processor core that is to generate the wrapped programming information, and program the DMA channel identifier to a channel filter.

18. The at least one computer-readable medium of claim 17, wherein the unprivileged processor instruction is to be invoked using the unprivileged software component, and wherein key-wrapping key is private to a processor.

19. The at least one computer-readable medium of claim 17, wherein the operations further comprise to assign, via a firmware environment, the trusted I/O processor reserved memory region.

20. The at least one computer-readable medium of claim 17, wherein the second instruction is a privileged instruction, and wherein the operations corresponding to the second instruction include to program the first range to the channel filter.

21. The at least one computer-readable medium of claim 19, wherein the operations further include to:

store I/O processor reserved memory region setting in a firmware variable in response to assignment of the trusted I/O processor reserved memory region; and integrity-protect the firmware variable with a trusted platform module of the computing device.

22. The at least one computer-readable medium of claim 20, wherein the operations further comprise:

invoking a third privileged processor feature instruction with the first range as a parameter; and securely clearing the first range in response to invocation of the third privileged processor instruction.

23. The at least one computer-readable medium of claim 20, wherein the operations further comprise:

verifying the wrapped programming information, wherein to invoke the first second privileged processor instruction comprises to invoke the first second privileged processor instruction in response to verification of the wrapped programming information.

24. The at least one computer-readable medium of claim 20, wherein the operations further comprise:

reading a cryptographic response from the processor in response to invocation of the first privileged processor instruction; and preventing the privileged software component from accessing the first range associated with the DMA channel identifier, and wherein the privileged software component comprises a kernel mode driver.

* * * * *